(12) United States Patent
Shiina

(10) Patent No.: US 8,179,822 B2
(45) Date of Patent: May 15, 2012

(54) PUSH-TYPE TELECOMMUNICATIONS ACCOMPANIED BY A TELEPHONE CALL

(76) Inventor: Kunihiro Shiina, Tokyo (JP)

(*) Notice: Subject to any disclaimer, the term of this patent is extended or adjusted under 35 U.S.C. 154(b) by 1388 days.

(21) Appl. No.: 11/574,389

(22) PCT Filed: Aug. 31, 2005

(86) PCT No.: PCT/JP2005/015934
§ 371 (c)(1),
(2), (4) Date: Feb. 27, 2007

(87) PCT Pub. No.: WO2006/025461
PCT Pub. Date: Mar. 9, 2006

(65) Prior Publication Data
US 2008/0037534 A1 Feb. 14, 2008

(30) Foreign Application Priority Data
Aug. 31, 2004 (JP) ................................. 2004-282719

(51) Int. Cl.
*H04L 12/16* (2006.01)
*H04L 12/28* (2006.01)
*H04L 12/56* (2006.01)
*H04L 12/66* (2006.01)
*H04Q 11/00* (2006.01)
*H04J 3/16* (2006.01)
*H04J 3/22* (2006.01)
*G06F 15/16* (2006.01)

(52) U.S. Cl. ........ 370/261; 370/264; 370/265; 370/353; 370/355; 370/356; 370/395.2; 370/395.5; 370/402; 370/467; 370/469; 709/206; 709/246

(58) Field of Classification Search .................. None
See application file for complete search history.

(56) References Cited

U.S. PATENT DOCUMENTS
6,141,340 A * 10/2000 Jain ................................. 370/352
(Continued)

FOREIGN PATENT DOCUMENTS
JP       10-228431 A      8/1998
(Continued)

OTHER PUBLICATIONS
English International Search Report mailed Dec. 6, 2005.

*Primary Examiner* — Nishant B Divecha
(74) *Attorney, Agent, or Firm* — Roberts Mlotkowski Safran & Cole P.C.

(57) ABSTRACT

Subject: Since today's conventional Web browsing employs Pull-Type Telecommunications, presently, it is necessary to employ keyboard operation in order to request information. Furthermore, the portability of today's devices is still substandard, and offering information based on another's situation is presently unavailable.
Method for Solution: When each telephone caller uses a telephone (including a cellular telephone), the computer connects the public Internet network and the Telecommunications with the exclusive software carried at each device, and the server performs Push-Type Telecommunications on the network, with which any information that is selected and transmitted by one side at any time is displayed or played automatically on the other side's monitor during conversation, the method by which audiovisual information is offered during the course of conversation is realized. Thus, as a result, a wide variety of functions, including an operation support function, a presentation function, conversation support using visual information, a performance offering a theme, as well as the advantage of enhanced portability, are all realized, and various services, including personalized, are enabled by automatically displaying the processed result of sound (voice) as input data on each telephone caller's monitor.

5 Claims, 11 Drawing Sheets

U.S. PATENT DOCUMENTS

Figure 1:
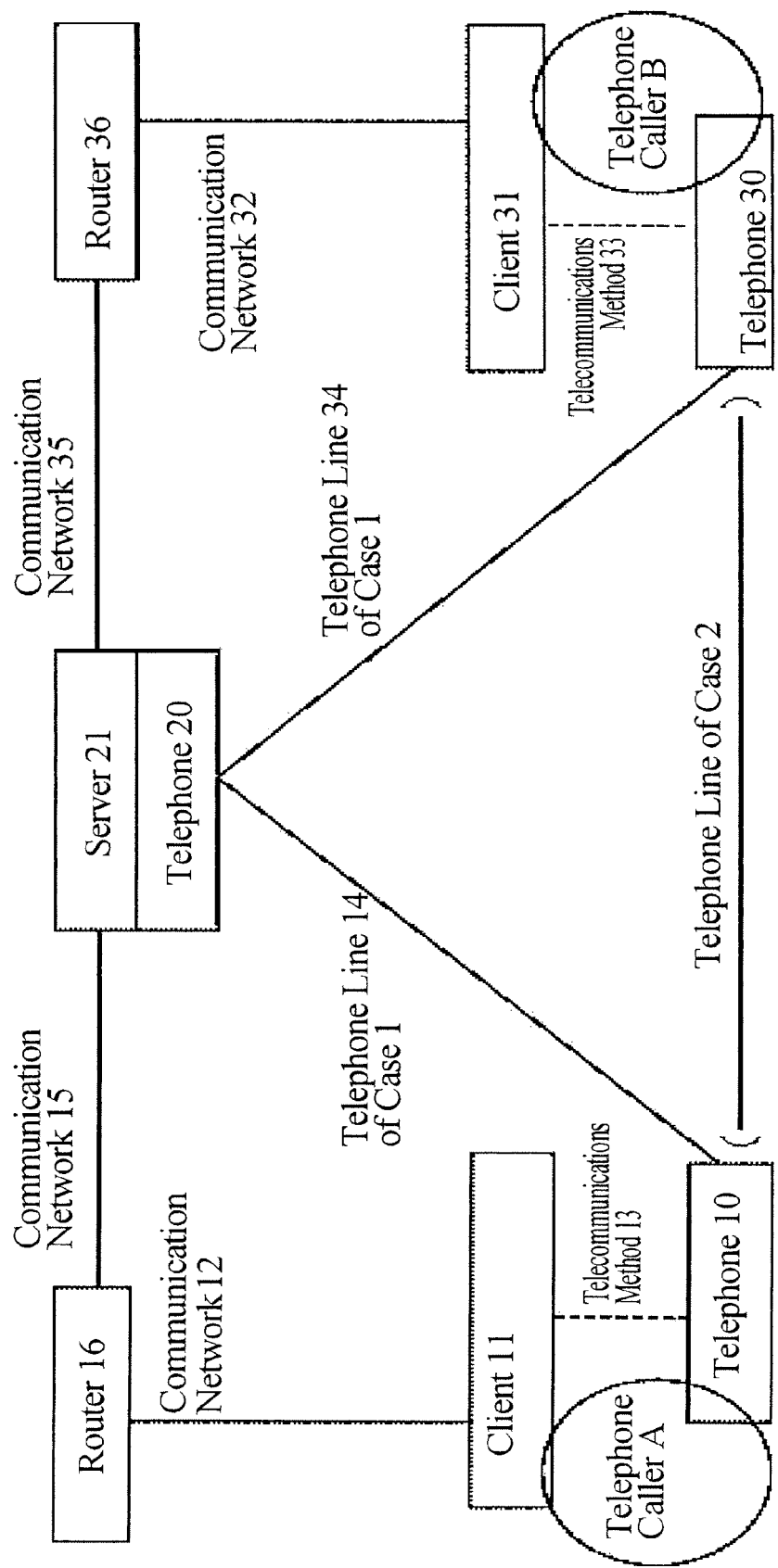

| | | | |
|---|---|---|---|
| 6,885,737 B1 * | 4/2005 | Gao et al. | 379/93.17 |
| 2002/0174177 A1 * | 11/2002 | Miesen et al. | 709/203 |
| 2003/0043974 A1 * | 3/2003 | Emerson, III | 379/88.13 |

FOREIGN PATENT DOCUMENTS

| | | |
|---|---|---|
| JP | 11-008715 A | 1/1999 |
| JP | 2000-152201 A | 5/2000 |
| JP | 2000-216917 A | 8/2000 |
| JP | 2000-295362 A | 10/2000 |
| JP | 2001-094671 A | 4/2001 |
| JP | 2002-152389 A | 5/2002 |
| JP | 2004-056523 A | 2/2004 |
| JP | 2004-140682 A | 5/2004 |

* cited by examiner

PUSH-TYPE TELECOMMUNICATIONS ACCOMPANIED BY A TELEPHONE CALL

TECHNICAL FIELD

This invention is about the realization of a Push-Type Telecommunications system, in which a telephone call simultaneously utilizes both the telephone and an Internet-connected computer.

BACKGROUND TECHNOLOGY

Basically, today's web usage is realized with a Pull-Type Telecommunications Method, with which a client sends a request message, in which the client actively specifies the information requested, to a server, and then the client receives a response message, containing the information requested, from the server end. Only recently, the usage of the Internet Telephone and IP Telephone has become widespread. When the Internet was created and was gradually adopted into popular use, the public did not realize the potential for a mode of operation that would simultaneously make use of the telephone function and check a web site. Therefore, even though the server sends the information to the client, and the client receives the information passively, no selection criteria regarding the type of information as well as the timing for sending this information were available without the client's request. Therefore, there was no reason to assume the existence of a service system with which the server both sends information independently and guesses the timing to send information to the client end.

Presently, there is a partial Push-Type information delivery system; however, this system resembles the Push-Type Telecommunications system, by responding to request messages sent continuously at constant intervals from the receiver side or when the sending side keeps sending information. It could be considered that this is not an actual Push-Type Telecommunications system in which the sending side understands the receiver side's situation and selects the information and the timing to send the information.

Furthermore, when the Internet was first created, many personal computers were in a fixed location, and one computer did not have a specific user. Therefore, even today, using an ID number and a password to specify the user, this combination is still risky, since the information can easily be stolen, giving users serious anxiety about security. There are increasing problems about Internet security in recent years. For security reasons, it is undesirable that the server side sends information actively and general users receive information passively. It is given that the standard for service systems is the combination which clients who request information actively and servers who send information as requested. Usually the socket of the client side is not prepared unless a request message is sent out; also, the port number is changeable (not fixed) so the server side cannot send information to the client side, even if the server side knows the IP address.

In general, most of the information services in daily life receive information passively. All broadcasts, such as TV, basically use the same system so that one receives information passively, even though one selects the TV channel. Furthermore, in many cases, the user watches TV without any specific purposes. Newspaper advertisements and advertisements in town work in the same way. It is desirable to use the service system so the user can get information passively, for example, education or information services in which one side knows the situation of the other and transmits some information. Furthermore, it is desirable in case the user cannot operate a keyboard, for example, elderly users who are not adept at keyboard operation or users who are too busy to operate a keyboard while doing some other task.

Basically, checking a web site on today's Internet is a Pull-Type Telecommunications system; that is why the dissemination side cannot tell about details, for example, who accesses the site, unless the Internet user chooses to write and leave their own personal information. Businesses like the real estate industry find it difficult to receive orders on the Internet and attract customers, and so these businesses do not post the details of their information on their own web page. Using Pull-Type Telecommunications, it is difficult to deal persuasively with customers, and that is why many companies choose to collect appropriate personal information (such as the potential customer's telephone number or home address), and then contact the individual again to provide some more information in greater detail. Furthermore, in many cases, users cannot collect enough information on the web site. Therefore, it can be expected that one can easily acquire more information in detail with access to conversation as well as the Push-Type Telecommunications at the same time.

Even though usage of the Internet is widespread today, a certain hypothetical Internet shopping site that is well-known by the young generation still has the same number of orders placed online on its web site and with telephone calls. Even though many of today's young people are adept at using the Internet for online shopping, they still would like to talk to the call center operator to get personal advice from them about the product and want to have one last push to decide whether to buy. Even though the Internet is a very convenient tool, it is still not enough when you compare it to the call center operator who personally provides the caller with a trustworthy tone or the exact advice the caller wants. Furthermore, for TV shopping, many customers place their orders with telephone calls, not online. It is easy to see that the customer still puts a great deal of weight on the personal touch of talking to an operator; simply buying products is not the customer's highest priority.

Fundamentally, in communication, factors other than language, such as intonation, pause and tone, also have major roles in conveying messages. For example, explaining with a textbook or showing pictures of the product is simply not enough. Even if there are some explanations provided with a tape-recorded voice message, it still will not be enough. These details provide the proof that many customers still want to conduct business with telephone calls in the future, even though usage of the Internet will continue to grow.

However, in fact, in many cases it is difficult to provide information, such as directions, only on the telephone, it because of the information's type. It is necessary to have some service system with both of the good sides.

Recently, usage of the IP telephone has become widespread, with the ability to make an Internet telephone call from a web site. It is now possible to have such a communication style that a person can speak on the telephone while watching a screen with some information. However, this kind of communication style will not be widespread easily, if the present conditions stay still.

PCs and telephones are independent devices, and they are usually set at different locations. In many cases, their respective companies who offer services are also different; therefore, it is necessary to have a different operation on these machines, so that one is not able to link the sound communication and data communication. Complicated PC operations produce the problem of the so-called "digital divide" today. Recently, mobile telephone usage is widespread, but it is difficult to assume that individual telephones will not exist anymore because the PC has a telephone function. Between the telephone and PC, there are the differences in their respective functions, uses, life spans, etc., and also, people save telephone lists and address books in the mobile telephone's memory. It is inevitable that a person buys a machine that has a telephone function and PC (two-in-one), even though the PC has a telephone function, if the usage is not changed from the present, and then there is not much of a necessity to purchase a telephone and PC (two-in-one) device. The growth of this style of use in which data communication and voice communication will be performed at the same time will be limited.

Even if they say you can talk on the telephone while sharing the information on web, it makes no difference that that is a Pull-Type Telecommunications method, and the information sending side is not able to give some information, depending on their conversations in good tempo.

The technology has already spread with which sounds are sent and pictures are delivered by interactive VoIP while checking on the web site, mainly by using a fixed computer. If you use the Internet call center, it is easy to consult with an operator about products using an Internet telephone on the same network while you are checking on their web site. It is possible to have a Push-Type Telecommunications with a telephone call if you add a few applications.

In 1995, an Israeli venture business introduced computer software, which has a telephone function to the market. After that, usage of the Internet telephone expanded. However, the telephone services by the public Internet have problems in quality, such as background noise, disconnection and cut off. Only recently, major companies have come into this field, and use lease lines. The quality has been improved, but it has not created the service with Push-Type Telecommunications.

Before that, the TV conference function has been developed, but this is basically done under the secure network, mainly for one's own conferences and meetings inside of a company. The essential view of the packet transmitting technology in the public Internet network, TCP/IP, and the one in LAN is completely different. The technology for streaming, such as that utilized in streaming a conference's images, and the Push-Type Telecommunications technology that transmits and receives optional information intermittently at elective timing with someone who is on the Internet network using different manufactured equipments, have different parts and technology, so the Push-Type Telecommunications system with a telephone call has not been developed which a large number of the general public using the public Internet network.

Suppose the quality of sound of the Internet telephone improved a lot, it is still difficult to expect that a person who is watching a TV shopping program brings a PC and starts up the computer to order the product by Internet telephone. It is a lot of work to set up a microphone to a PC to talk, or even if one has a built-in microphone TV set or monitor, they are not always conveniently next to you. It is not natural to talk to a machine with a loud voice. If it is so, it is natural to use one's own home telephone, mobile telephone or an IP telephone, with less trouble, to make a call. Already, as mobile telephone usage is widespread, and from now on, as mobile IP telephones will become more commonplace in the world, users are going to have various services provided by various companies. It will become increasingly unnecessary to start one's own PC to use the Internet telephone. In addition, if the price comes down for a PC and widescreen, high definition monitor, it is unnecessary to restrict the usage of the PC to have Push-Type Telecommunications with a telephone call. This is openly discussed when people talk about the ubiquitous world image, with which various devices connect networks, and people will be able to access networks anywhere in the near future.

In that case, the practice of having the Push-Type Telecommunications service while you talk on the telephone with a comparatively big screen monitor and PC with telephone function is not the only way.

Furthermore, if many kinds of telephone companies will provide telephone services, and there are a lot of Internet providers, people will not always choose the same company for their Internet connection service and telephone service for different purposes. On this point, Push-Type Telecommunications service will require using a unified telephone service and data service which has different contract companies, to achieve Push-Type Telecommunications with a telephone call that does not create any problems about charges.

As we will discuss later, with the Push-Type Telecommunications with telephone call of this invention, the user and situation will not only be involved with using a PC. If possible, ideally, users should utilize their own telephone equipment to have Push-Type Telecommunications with telephone call wherever a computer and monitor are set up.

However, devices and services for Push-Type Telecommunications with telephone call with telephone and telephone service, and computer and monitor, intended for general public users, have not yet been invented.

Furthermore, even though there is the possibility to get Push-Type Telecommunications with telephone call, since mobile telephone functions are increasingly advanced, one still cannot resolve the fact that the screen display is small. This fact will clearly present more of a problem for the elderly in our aging society, who have difficulty reading small letters.

RELEASE OF INVENTION

The Target that the Invention will Solve

Basically, today's usage of web sites on the Internet represents Pull-Type Telecommunications; however, interpersonal communication (human to human) usually repeats the process of Push-Type Telecommunications. In fact, the Pull-Type is generally used for collecting information or inquiring, such as finding information from books. For example, during conversation, people not only specifically answer the question presented from the others, but they also respond and elaborate with words from their own imagination. To repeat this process creates conversations.

This invention will introduce a system which makes it possible to see and hear information passively, during the course of the conversation, without disturbing the caller, and the information that was sent out by a call partner is displayed and played automatically on the monitor that the caller uses. While speaking on the telephone, it does not matter whether you are talking to another person or an automatic answering system.

During the course of the conversation, one sends out arbitrary information to the other's computer at any time and the information is displayed on the monitor by browser without operation of the other side's computer with the Push-Type Telecommunications. These steps create communication created that is closer to our own human communication, creating a new Internet service that presently does not exist.

For senior citizens in today's rapidly-aging society, a small screen limits the potential for usage, and the complicated operation using small push buttons that is presently in use, such as that employed on the cellular telephone (for example, with i-mode) is especially problematic. A complex input operation, such as keyboard entry, basically cannot be avoided since it begins with the client side sending a request in the Pull-Type Telecommunications.

This invention offers the Push-Type Telecommunications with a handy, convenient telephone call, using equipment similar to that employed in a cellular telephone, so even if the data communication service company is different from the cellular telephone company, with equipment physically separated (cellular telephone machine and that of the cellular telephone), and thus achieves portability.

In this invention, the arbitrary information on the Internet is checked by the arbitrary public displays put on the street corner as well as on one's own cellular telephone, and with the same simplicity with which one makes a telephone call, it becomes possible to check the information which the telephone caller has arbitrarily selected, and sent out according to the course of the conversation. The possibility that a different style and purpose for using the Internet from that formerly available is offered.

Based on the individual attribute specified from a cellular telephone number, the location of the monitor device, such as a public display, and the expected situation, depending on time, the offer of the user-friendly service system using the customized initial screen is attained.

When using a computer, an application was usually installed on the computer and the application concerned is used by keyboard operation. Since the manner of use becomes complicated, the usage of applications with voice input from a personal computer has not spread so much.

This invention offers various services that are different from the present Pull-Type Telecommunications system and the keyboard input operation utilized in the past, according to the processing of sound as input data with the computer on the network, even if the separate hardware is not attached to the computer, by displaying the result by browser automatically, so that a complex operation is not accompanied.

This invention will now be described, mainly focusing on the combination of the monitor-connected client and telephone: the data could be received by the server on the caller side and displayed on the monitor, and it is possible to produce the same result, and in a sense, this system is simplified. However, considering the computer equipment existing in the world, there is much more equipment used as a client than that used as a server. When a server is used, server software and a firewall are necessary, and if the IP address is not fixed, the IP address must be managed. For the maintenance, technical knowledge is required. Although this invention does not eliminate the system by which the telephone caller side is also used as the server, it is only called for that the device that a telephone caller uses to receive data intermittently at the time of Push-Type Telecommunications, and a server does not have to be used.

One of the main purposes of this invention is in the point that people without knowledge of a computer also tend to use the Internet like a telephone, and the point used as the system which is easy to spread widely, and it will become impossible to attain the original purpose in the system which forces users to deal with an expensive, complicated preparation. The device, which a telephone caller uses from the viewpoint of aiming at being used widely, is centered on the system using a client and telephone. Moreover, it is more desirable to consider the composition for which a server machine may be used, depending on a case.

Additionally, when an actual usage scenario is assumed, only the Push-Type Telecommunications accompanied by a telephone call may be used, or one of the following three conditions can be imagined: First, it shifts into Push-Type Telecommunications from the state which is carrying out the usual web browsing. Second, when Push-Type Telecommunications mode is finished, the use will return to usual Web browsing. Third, when a telephone caller also performs some screen operation in the midst of Push-Type Telecommunications. In these 3 previous conditions, focusing mainly on the combination of the monitor connected to the client and a telephone is desirable.

By using a Telecommunications network and a home telephone or cellular telephone owned by specific private user, which have been registered with personal information when signed up, or by using voiceprint, a highly secured, personalized security protocol that provides a higher level of security than the combination of ID and a password will be offered at the computer.

Considering the service in which two or more users must have the same system, like this invention, unless the system is widespread with a specified amount of people using it, it will not be efficient and convenient; if it is not, it tends to lapse into a vicious circle: with such service, the possibility is high that the system will not widespread, even though the equipment is excellent in achieving its technical engineering target. In its initial stage of introducing this invention, it will provide enough convenience and efficiency to the customers by using a public Internet network and a telephone line network (those we already have in place) and giving the Internet use support service for beginners, or displaying the service method of processing result of the application on the computer on a network by the browser.

THE METHODS FOR SOLVING A SUBJECT

Hereafter, the definition of the term in this specification carries out as follows: Telephone and telephone service mean a home telephone which is connected by the dedicated telephone line, telephone service such as a cellular telephone, IP telephone service offered by a provider, and, in addition to these, it includes the Internet telephone connected to the public Internet network using the exclusive application by packet switching technology. Telephone means the equipment to be used for performing the services described above, and includes a computer equipped with a microphone and a speaker, or a PDA connected to an earphone.

Telephone number means in addition to the telephone number itself, the information specifying the telephone to connect, such as a global IP address and a port number, in case the telephone number is not given, such as an Internet telephone. However, when a client acquires the IP address and port number of both telephones under use to check that the telephone is connected, the IP address and the port number of the telephone for the same caller could be a private IP address and a port number. In this case, the telephone number also includes the information that is client-acquired to specify both telephones in use by exchanging the information between these telephones, such as the MAC Address of the both telephones in use. Moreover, it includes the random numerical value and specific code for specifying the telephone, which are shared on the telephone of the telephone caller in use and the server on a network.

A telephone line means a dedicated line of a telephone company and also includes the public Internet network that transmits and receives voice data as a packet or the wireless network by wireless LAN.

Telecommunications network means the public Internet network that connects a computer and other computer equipment and network connecting to it, such as a dedicated line, a feeder line, and a broadcast channel of a cable TV. Here, the Telecommunications network is different from the telephone line. Since this invention aims at being used among the unspecified users developed by a wide area, these following cases are not mentioned; the network using only LAN, when a special application is installed in advance to communicate between only a few specific devices by using a public Internet network, and a network under the situation with which each caller already knows the information to specify devices, such as an IP address, a MAC Address, etc., of all terminal machines in advance.

IP address means the necessary information to access a specific computer, such as an IP address, port number and URL, etc., including the random numerical value and specific code for specifying the client which is shared on the client of the telephone caller linked to a Telecommunications network, and shared on the server on a network. In addition, a telephone line and a Telecommunications network do not necessarily have to be the same network.

The expression Push-Type Telecommunications accompanied by a telephone call means the Telecommunications method using a telephone service while talking on telephone to send information which caller creates or selects during the course of conversation at any time to other caller's computers which are authorized in advance or send out the computer processed output data, which is the voice data from the telephone as input data to each caller's computer and the sent out data, which the computer received displays on its monitor or plays.

A telephone caller means the person who talks on the telephone using Push-Type Telecommunications accompanied by a telephone call.

A client means the computer equipment connected to a monitor that is able to display a screen, and is different from the telephone. The telephone that each telephone caller uses and a client could have separate equipment physically or could have the same equipment. When an IP telephone is used as the telephone or a computer is used as an Internet telephone, the IP address and MAC Address of the telephone that Telephone Caller 1 uses are the same as those of the client that the same telephone caller concerned uses, or they may differ.

Each device means all the computer equipment and telephones mentioned above. A Push-Type information command means the start-up command to perform Push-Type Telecommunications software (hereafter described as Push-Type Telecommunications software).

As shown at FIG. 1, this invention consists of the following equipment: Telephones 10 and 30, which each telephone caller uses, Client 11 and 31, Telephone Lines 14 and 34, Telecommunications Networks 15, and 35, Telephone 20 connected to Server 21, and Server 21 on a network, Push-Type Telecommunication software installed on each device and data transmitting cable or wireless Telecommunications Methods 13 and 33 between a telephone and client when a telephone which the telephone caller uses and client are physically separated. The Router shown in FIG. 1 is optional. The feeder lines will be Telecommunications Networks 12 and 32, in case there are Routers 16 and 36. Additionally, Server 21 consists of two or more servers connected in the network, and may be functioning in one. Telephone 20 and Telecommunications Methods 13 and 33 may not exist, depending on the combination.

Methods to solve the target of this invention are hereby described. (1) One method: each client obtains the IP address of the same Server 21 and access Server 21, and connects both the Telecommunications networks and telephone lines between each telephone caller. (2) One method: Server 21 saves information about the telephone which each telephone caller uses, telephone number, IP address, etc., to specify the client and combine information. Then it checks completion of preparations of Push-Type Telecommunications such as start-up of Push-Type telecommunications software in each client, or prepares it for the system. It checks whether the receiving data is transmitting from the telephone caller who performs Push-Type Telecommunications or not, and specification of a data transmission place. (3) One method by which each client knows or guesses the timing to which other clients sent out information. (4) Server 21 changes data form if needed, and transmits information so that display and reproduction of the data sent out by the Telephone Caller 1 may be displayed and played in another telephone callers' client, and the information that each client received is displayed on the monitor or played.

There are two methods of connection for a telephone. In the case 1 of FIG. 1, each telephone is connected with Server 21, and the telephone call is made through Server 21, which connects each of the telephones. In the case 2 of FIG. 1, each telephone is connected directly, and has not considered Server 21 as intermediation.

Although Telecommunications Methods 13 and 33 are mainly used for transmitting information or the starting-up of the Push-Type Telecommunication software to Server 21, combining the information for a client and telephone, telephone number, etc., to a specified client and an IP address. When a function as mentioned above can be compensated with other methods, Telecommunications Methods 13 and 33 are not necessary.

This invention is constituted by the methods above-mentioned (1) to (4). Although each method has many situations as the following clauses show to the methods of (1) to (4), the combinations can be effected in any way. Moreover, various detailed techniques can be taken in technically. Or the composition and the procedure of bringing about the same effect as (1) to (4) as long as it is the Push-Type Telecommunications accompanied by a telephone call could be used. It is constituted by the methods above-mentioned (1) to (4), and as long as the Push-Type Telecommunications shown by this invention is attained, methods (1) to (4) may be realized using arbitrary methods.

For example, the function of Server 21 could be divided between two or more servers on a network, and composition, which covers a previous function, could also be used. When it covers the function of Server 21 with two servers, as Server 21 and the Server 22 are put on the position of the Router 16 of FIG. 1, the information that Server 21 received from Client 31 is immediately transmitted to Server 22. Server 21 tells Client 11 that the information was sent out, and Client 11 requests the information to Server 22 can also be taken as a composition. Thus, the advanced style of the fundamental composition of this invention can be considered in a variety of ways. Push-Type telecommunications software is designed so that the same convenience as the methods of (1) to (4) may be obtained, and has necessary operations such as informational transmission and reception. In addition, it could be set up as only some clients receive Push-Type Telecommunications.

Hereafter, (1) describes the method when each client obtains the IP address, etc., of the same Server 21, accesses Server 21, and connects both the Telecommunications networks and telephone lines between each telephone caller.

In FIG. 1, 1) Telephone caller's telephone calls Telephone 20. 2) Telephone caller's telephone calls the other caller's telephone. 3) Connecting operation, such as access to Server 21 from client. 4) Telephone 20 calls telephone caller's telephone. 5) Push-Type Telecommunications is chosen or accepted, based on the operation of telephone or operation of a client, Push-Type Telecommunications command is made. 6) Acquire a Push-Type Telecommunications Command by Telecommunications. 7) The IP address of Server 21 that is registered on a telephone callers telephone, or that is telephone caller's telephone acquired transmitted to a client through Telecommunications Methods 13 or 33. 8) The IP address of Server 21 is transmitted to a telephone caller's telephone from Telephone 20, and the IP address concerned, etc., is transmitted to a client through the Telecommunications Methods 13 or 33. 9) The IP address of Server 21 is transmitted to the telephone of another side from a telephone, and also is transmitted to a client through Telecommunications Methods 13 or 33. 10) Client acquires the telephone number of Telephone 20 at the time of accessing to Server 21, and then is transmitted to Telephone 10 or 30 through the Telecommunications Methods 13 or 33. 11) Client 11 or 31 acquires the telephone number of Telephone 10 or 30, through the Telecommunications Methods 13 or 33, at the time of accessing to Server 21, and is transmitted to Server 21. 12) Telephone number of telephone that is registered in advance or is saved by input operation of the caller beforehand is transmitted to Server 21 from a client at the time of accessing Server 21. 13) Client transmits telephone number to Server 21 and Telephone 20 transmits to the other telephone at the time of accessing to Server 21. 14) When a telephone callers telephone connects with Telephone 20, the telephone number of another side is transmitted from Telephone 20. 15) One or more telephone callers telephone calls other telephones, including Telephone 20, by Push-Type Telecommunication software (the specified program) based on the telephone number acquired by performing the process shown 4) to 14). 16) Based on the IP address acquired with the combination of operations of 4-14 above, client accesses Server 21 by Push-Type Telecommunication software. Thus, operations of 1-16 and other operations are combined suitably. As shown in either FIG. 1 or 2, both Telecommunications networks and telephone lines are connected. Push-Type Telecommunication software is started by the Push-Type Telecommunications command in each client and Server 21, at each telephone, if needed.

In this case, a telephone line may connect with Telephone 20 shown as case 1, and a telephone line may be directly connected among telephone callers shown as case 2.

Figure 3:
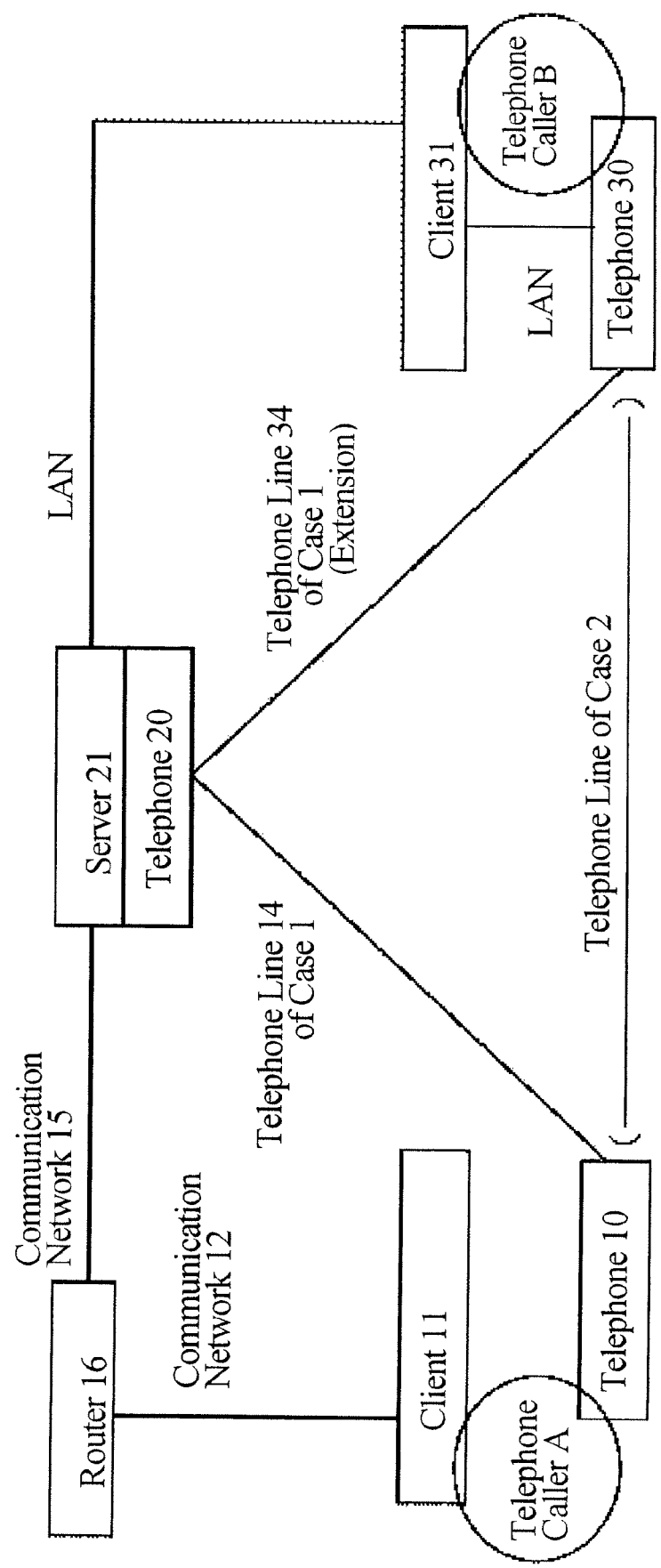

For the operations that are mentioned above, the information that is already registered in advance could be used. When there are no Telecommunications Methods 13 and 33 as shown in FIG. 3, the information that is registered in advance at each device may be used to perform Push-Type Telecommunications is described.

Beforehand, the client for Push-Type Telecommunications accesses Server 21 and registers at Server 21 the information that the client concerned has chosen Push-Type Telecommunications in Server 21. This registration information may be a fixed IP address, and may be specific information, such as a password, for specifying the device to be used on the occasion of registration. Additionally, in the case of registration in advance, the telephone number of the telephone that is combined may be specified, or since it is premised for public usage only, a telephone number may not be specified.

Each telephone may also register a client that may be used for Push-Type Telecommunications to Server 21 in advance.

When there are not Telecommunications Methods 13 and 33, the client to be used should be started up in advance, and Push-Type Telecommunications software should also be started up at the client concerned. At the time of starting or suitable timing, the client concerned accesses Server 21 by Push-Type Telecommunications software. (1) When an IP address is fixed, Server 21 recognizes by the accessing that the client concerned is prepared for Push-Type Telecommunications software. (2) Even if an IP address is fixed or changeable, a client recognizes whether the device is registered or not, and the Push-Type Telecommunications software has been prepared for the client concerned using the specific information for specifying device, such as an ID, a password, etc., which the client transmitted at the time of access, and, in either case, acquires information, such as the IP address of a client.

In order that the Telephone Caller A connects to Telephone 20 to perform Push-Type Telecommunications from Telephone 10, Server 21 can narrow down the candidate of the client that the telephone caller of Telephone 10 is going to use for checking, based on the information registered in advance. Moreover, the position information of the closest base station to which Telephone 10 connects and the position information which Telephone 10 itself acquired from the function of GPS are transmitted to Telephone 20; then by receiving the information of these processes at Server 21, the candidate of client can also be narrowed down. This means that the client can narrow down to which is not used by other telephone callers nearby the client of the Telephone Caller A and the registered client combined with the telephone number of Telephone 10 and clients in use in public at the moment. Additionally, it can also narrow a candidate when the Telephone Caller A returns the information that is written on the device itself or around to Server 21 through Telephone 20 using Telephone 10 by sound, button operation, etc.

Server 21 sends out different information, such as text, a picture and sound, to each of the client candidates, which have been narrowed down, and by the method mentioned above, each client candidate displays and plays the information concerned on a monitor. The telephone caller checks the information concerned and returns information or the assumed information by this information to Server 21 through Telephone 20 by the sound, button operation, etc., using Telephone 10. Based on this process, Server 21 can specify the client that Telephone Caller A uses for checking information.

Therefore, in this case, the method of (1) and the method of (2) will be performed simultaneously. By this process, even if the IP address of a client is fixed or changeable, or even if the telephone that is used is combined with client that is specified or not, Server 21 specifies the client concerned, and it is possible to acquire the IP address, etc.

When Telecommunications Methods 13 and 33 are wireless-communications methods, and also when the client transmits information such as a telephone number, etc., to the telephone that omits Push-Type Telecommunications, or when the telephone transmits information to a client that omits Push-Type Telecommunications, and when two or more devices exist nearby, the methods for specification and connection may be taken any way. However, the fact could also be specified that at the device of the transmission place, Push-Type telecommunications software is installed and the combined information of the client and telephone is not acquired, or the fact that Server 21 is not specified. Furthermore, by sending specific information that was transmitted from Server 21, as mentioned above, by voice or push-button operation on a cellular telephone, the receiver can be specified.

Hereafter, a method to perform confirmation of receiving data being done by the telephone caller who performs Push-Type Telecommunications, and specification of a data transmission location is described: (2) Server 21 saves the combined information about the telephone that each telephone caller uses, and the telephone number and the IP address that specifies a client, confirms that the telephone caller is talking on the telephone, and finally confirms completion of preparations for Push-Type Telecommunications, such as starting the Push-Type telecommunications software in each client, or it allows each client to prepare. Since the preceding clause has already shown the method in case there are not Telecommunications Methods 13 and 33, the case where there are Telecommunications Methods 13 and 33 is described below.

If each client and each telephone are connected to Server 21 or the telephones are connected to each other, as shown in the case 1 or case 2 of FIG. 1, the telephone caller who has not completed the selection procedure of Push-Type Telecommunications yet will perform an acceptance operation of the proposal of Push-Type Telecommunications by operation of telephone or a client. This operation is performed in the state where only the telephone is connected, and when the process of the method stated above is completed, with this operation, the IP address, etc., of Server 21 is transmitted to a client. Moreover, it may be performed by screen operation of the client linked to Server 21, and required information may be transmitted to the telephone.

If each telephone caller performs a selection operation or acceptance operation of Push-Type Telecommunications, the information will be transmitted to Telephone 20 from each telephone caller's telephone and transmitted to Server 21 from each client through Telecommunications Methods 13 and 33, and Server 21 will confirm that each telephone caller agrees to perform Push-Type Telecommunications.

By either a selection operation or acceptance operation of Push-Type Telecommunications, a Push-Type Telecommunications command is generated or transmitted in Server 21 and in each of the devices, and then Push-Type telecommunications software of Server 21 and each of the devices start.

Shown as case 2 of FIG. 1, when each telephone caller's telephone has not been connected to Telephone 20, a client transmits information, such as the telephone number concerned, and a Push-Type Telecommunications command to Server 21 by Push-Type Telecommunications software.

Shown as case 1 of FIG. 1, when each telephone of a telephone caller has been connected to Telephone 20, it can confirm that Server 21 is in use (during conversation). By the fact that each client transmits the telephone number of the telephone that the same telephone caller uses to Server 21, the IP address of the client and the telephone number of telephone are combined, recognized and saved at Server 21. At that time, it can also confirm that the signal that Telephone 20 has transmitted comes back via Telecommunications Methods 13 or 33, and a client.

The IP address of each client is transmitted to Telephone 20 from each telephone to recognize the combination. However, in this case, there is the possibility that the IP address of a client may be converted at the Router, so a client needs to transmit a global IP address, which is acquired by operation with the Router, and needs to transmit a private IP address separately to Server 21.

Shown as the case 2 of FIG. 1, when a telephone caller's telephone is connected directly, it can confirm whether a certain signal or information which Server 21 transmitted to one side of the client comes back to the telephone, from telephone to the another side telephone, from another side telephone to another side client, to another side client to Server 21 through Telecommunications Methods 13 or 33, and the telephone number of the telephone combined transmitted from the client.

Thereby, Server 21 can compare or specify the telephone caller of the source of the transmission-and-reception data.

Additionally, when a telephone is connected to Server 21 through Telephone 20, or when the client is connected with telephone by the communication method, Server 21 can confirm whether a telephone call is ongoing or not, while the information is being sent out; then when a telephone is disconnected, the end of Push-Type Telecommunications can be directed to each client and Server 21.

Hereafter, (3) the methods that each client knows or guesses the timing of information transmitted from other clients will be described.

The first method: each client recognizes the timing of information transmitted from the other client when Push-Type telecommunications software has been activated, while Server 21 sends out information, the signal of information transmitted was transmitted to each telephone from Telephone 20, and then each telephone transmits this information to each client through the Telecommunications Methods 13 or 33, based on reception of the signal of this information sent out.

An information signal could also be a specific voice pattern and a specific digital code that is fixed beforehand, and the URL information could be transmitted to Server 21 instead of to the signal of the information sent. A signal and URL may be transmitted by e-mail, short message, etc.

The second method: when Push-Type telecommunications software is activated, each client transmits frequently the request message to Server 21, which confirms the information is being sent out, and then Server 21 returns a response message to it. By this, each client confirms the existence of information being sent out or not.

In this case, it also could be confirmed as shown by the following: Server 21 transmits the transmitted information concerned to the local server from each client, and then each client transmits a request message to each different server concerned.

In these two methods mentioned above, Push-Type telecommunications software transmits the request message to Server 21 as confirmation, which indicated the port number of the TCP header of the transmitting side to the software concerned, in order to receive a response. If there is no sent-out information, in order that Server 21 will return the response message, it indicates that there is no message, and then the Push-Type telecommunications software that received this answer information cancels the answer information concerned. If there is sent-out information, Server 21 will return a response message that indicates the URL information that the sent-out information concerned is saved, and then the Push-Type telecommunications software that received this information transmits a request message based on the URL information concerned, and acquires information from the Internet.

The third method involves telling each client having awaited the socket which receives information, during stand-by mode, notifying Server 21 that the client is in stand-by mode, having gone into the stand-by mode, and permitting access of a communication packet on condition that the IP address of Server 21, a port number, the password further fixed Server 21 beforehand (if needed), when Push-Type telecommunications software starts. You may make it repeat this operation keeping a suitable interval. Server 21 will transmit the communication packet that confirms having received information to each client, if information is received from the client of 1.

In this case, irrespective of the written contents of the address port number indicated by the TCP header of the communication pack, etc., concerned which the client received, Push-Type telecommunications software or TCP/IP software cancels the packet concerned as it is in the stage that received the communication packet, and erases a socket, and Push-Type telecommunications software checks only the fact of having accepted the packet. Based on this fact concerned, Push-Type telecommunications software generates a new socket (making TCP/IP software generate a socket), and transmits the request message that checks the existence of information transmitted to Server 21. Hereafter, it will assume the same method as that of the two previous methods.

Server 21, which received the request message that was sent to notify that it is in stand-by mode, does not return a response message until the next specified time that notifies information has been transmitted. Furthermore, the destination port number on the TCP header of the communication packet, which notifies that there was informational transmission that Server 21 previously transmitted, is the same as the port number that was acquired when it was notified that it gone into stand-by mode. Even though a specified time passes, it performs address conversion in Router 16 appropriately.

When informational acquisition is completed, Push-Type telecommunications software generates the socket again, having considered the stand-by mode, and notifies Server 21 that the condition is in stand-by mode.

When it is indicated that there is no informational transmission in the response message at the time of transmitting the request message of an information check sent out to Server 21, it notifies Push-Type telecommunications software that the socket is in stand-by mode again, and notifies Server 21 that the condition is in stand-by mode.

In addition, if there is no problem with security, each client will await the socket that receives information and will consider it in stand-by mode, to access the packet, on condition that the IP address of Server 21, a port number, the password fixed Server 21 further beforehand, and will acquire data. Or a special header is added to a packet and you may make it transmit the request message that received only the packet with which the special header concerned is attached and fulfills conditions, or served both as the check and the information demand.

You may combine three kinds of above methods suitably. Moreover, you may use other methods, such as an instant messenger, with the same effect.

A server is put in the place of the client of a telephone caller side, the IP address, etc., of the server concerned, and is told to Server 21, and you may enable it to always receive the transmitted data.

Hereafter, (4) Server 21 changes data form if needed, and transmits information so that display and reproduction of the data sent out by the Telephone Caller of 1 may be done in other telephone callers' client, and each client describes the received information concerned about a picture display or a method to reproduce.

When each client sends out information to other clients, each client sends out information to Server 21 by form, or mail and other arbitrary methods. At the time of Push-Type telecommunications software starting, if information is received from the client of 1, Server 21 checks that it is transmitting data from the client compared with the IP address which saved by making a transmitting agency IP address into a pair, and data, such as a telephone number, and chose Push-Type Telecommunications, and other clients are told about information sent out, such as signal sent out to a telephone, a reply to a response message, and packet transmission to a client.

Server 21 changes the received information into the document of the language form, which the browser of each client can display and reproduce again, and saves the document concerned at a suitable URL. Generally, it will be HTML document format, and a client transmitting a request message again and acquiring it from the once-transmitted HTML document, a picture, an image, a sound, etc., may be transmitted in another language form and received as long as the browser can be displayed and reproduced.

When each client transmits a request message to Server 21, even if there is no publication that specifies information as a request message, since Server 21 can be distinguished if the information that should be sent out is information received immediately before, they can also transmit the information concerned to each client as a response message. Each client displays and reproduces the received information by the browser. When the information to transmit is an image and sound, you may set up so that Push-Type telecommunications software may reproduce received information by streaming automatically. Since the form will be the same as acquiring information from the Web presently, once a client begins to receive information from Server 21, no special problem will be encountered.

In order to maintain security, it may be made for the Push-Type telecommunications software of each client to limit the application with which a browser displays and reproduces received information at the time of Push-Type Telecommunications, and you may make it start required application automatically and suitably, according to the contents of an HTML document. Additionally, a file is downloaded, and you may make it open automatically from other FTP servers.

Although the above information involves the Web, you may also command Push-Type telecommunications software to open a file automatically, using other means, such as an e-mail, suitably as an informational transceiver.

When acquiring the information on a public Internet network, URL input or the link function is activated spontaneously while each telephone caller talks on the telephone. During this stage, Push-Type telecommunications software temporarily interrupts operation, returns a client to the stationary state, and acquires information by a URL input and link operation of the telephone caller. Furthermore, informational reception is completed by input operation of the telephone caller, and then this invention will be operated again.

When the telephone conversation has been disconnected, the information that the telephone was disconnected is transmitted to each client through Telecommunications Methods 13 and 33, and it is also transmitted to Server 21. When Telephone 20 disconnects a telephone line, Server 21 transmits the information that the telephone line was disconnected to the respective client, and then, Clients 11 and 31 finish operation of Push-Type telecommunications software, if necessary. Server 21 cancels data, such as an IP address of both clients, and a telephone number, if needed, and finishes operation of Push-Type telecommunications software, and Push-Type Telecommunications ends.

When there are no Telecommunications Methods 13 and 33 shown as case 2 of FIG. 1, based on the input operation to the client of the Telephone Caller of 1, or when a specified time has passed from the last operation of Push-Type Telecommunications, Push-Type Telecommunications end. This will be notified to another client, and the whole operation will be completed.

In addition, in the method mentioned above, after a telephone line is connected and a client accesses Server 21, the voice data of telephone will be transmitted to Server 21 from a client through a telecommunications network and Telecommunications Methods 13 and 33. Additionally, the system with which Server 21 transmits information to a client through each telephone and Telecommunications Methods 13 and 33 may be built separately.

Various methods will be assumed as Telecommunications Methods 13 and 33, including wireless LAN (radio-communications method), an IC card and a reader writer, Bluetooth, infrared transmission, UWB, etc., and the communication procedure is also arbitrary. Transmission and reception may be executed between a telephone and a client in the case of wireless LAN through an access point. However, as for a method and a procedure, standardization is desirable, in order to improve user-friendliness.

By registering information into each device in advance, you may omit a part for a previous procedure. Moreover, you may substitute operation of telephoning or accessing a specific telephone number at a specific Web page for the procedure reflecting the intention that a telephone caller performs Push-Type Telecommunications.

Although the above situation assumes the case in which two telephone callers communicate, even if three or more sets of clients connect with Server 21, the Push-Type Telecommunications accompanied by a telephone call employing the same method is possible.

The Push-Type Telecommunications accompanied by a telephone call is attained with a combination of the all of the above-mentioned methods.

In this case, even if the telephone service company and the Internet access service company that each telephone caller uses are identical, they still may differ. Since Server 21 does not need a private IP address even when a Router and IP address conversion is carried out between Telecommunications networks, a problem is not created with the implementation of this invention. According to this invention, it becomes possible to combine with a suitable nearby computer terminal, using a pocket device such as a cellular phone, as telephone, and to perform Push-Type Telecommunications accompanied by a telephone call, and enhanced portability can be realized. If the administrator of Server 21 can take access permission and fee collection procedures by a suitable method on the occasion of use of Server 21, and a telephone line is connected to Server 21 like the case 1 of FIG. 1, a simple fee collection method can be administered.

Figure 2:
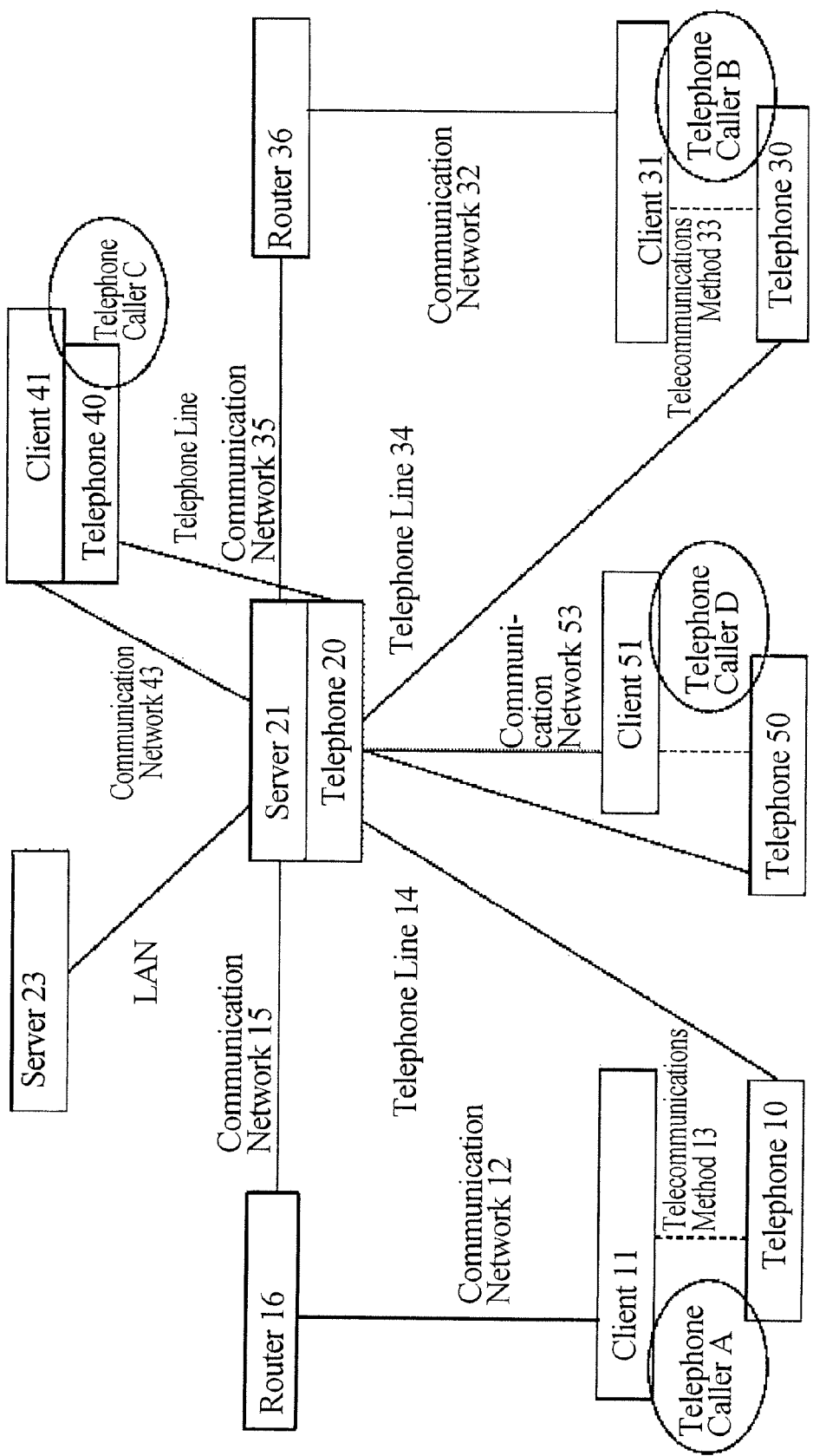

As shown in FIG. 2, each telephone is connected to Server 21, and it connects so that voice data may flow on another side via Telephone 20 and connects Application Server 23 to further Server 21, and the output data which processes voice data with the speech recognition application of a Server 23 simultaneously is processed with another application further by transmitting the output data to each client as input data is attained in a sound for a single or multiple telephone callers.

Although Push-Type Telecommunications is performed between each telephone caller's client and Server 21, while the sound that each telephone caller utters into the respective telephone is transmitted to other telephone callers as it is via Telephone 20, the voice data is also transmitted to Application Server 23 through Telephone 20 and Server 21.

Application Server 23 uses the voice data concerned as input data, and changes it into text data, etc., using a speech recognition application. Another arbitrary application software as input data processes the text data concerned. The output data is transmitted to Server 21. Server 21 transmits to each client by the Push-Type Telecommunications method, and the browser of each client carries out a picture display and reproduction. By this, each telephone caller can look at the information, which Server 23 outputted to the monitor, or can hear it while the caller hears the voice of the other caller who originally spoke.

The following are assumed as examples of the function of an application server a speech recognition as a text format function; a voice input operation function; the foreign language conversation support function using automatic translation software; the personalization function using the voiceprint; the game function enjoyed while talking with friends, such as a game of go, shogi, and mah-jongg. In the case of a game, some voice data is recognized as a command of game software, and it is dealt with appropriately.

However, client personalization, which utilizes a telephone, becomes impossible without Telecommunications Methods 13 and 33. Since the telephone caller who uses a client and telephone (by the method described previously) is the same, Push-Type Telecommunications can be smoothly executed.

The side that sends out information in a specific Web page overwrites information suitably, and according to the signal with a sound, as a telephone caller pushes the renewal button of the browser each time, a case of pseudo-Push-Type Telecommunications may occur.

The case by which personalization using a telephone is performed is hereby described:

If arbitrary signals or information that Server 21 has transmitted to a telephone are returned to Server 21 from a client via Telecommunications Methods 13 and 33, or if the information that Server 21 transmitted to each client is returned from each telephone via Telecommunications Methods 13 and 33, it can check that Server 21 is equipped with the communication means between a client and telephone, and can safely assume that the same telephone caller uses. Additionally, evidence of a telephone caller's intention can be taken by the context of the conversation itself. The user of a client is specified by the telephone number, which has been registered to an individual or a company. Moreover, some voice data is extracted, and the personalization in comparison with the voiceprint that has been registered beforehand is attained using the voiceprint confirmation software of Application Server 23. By notifying the result of each telephone caller's voiceprint or the confirmation fact that is described before, to the other side client, the personalization between callers will be executed.

THE EFFECT OF THIS INVENTION

Operation Support Function

An extreme case, for example, when the first connection is performed by the telephone between telephone callers: Even if the telephone caller is a pure beginner to the extent that he/she forgets to turn on the computer's power, the other party can give directions with sound to turn on the power to the respective telephone caller. Additionally, since transmitted information can be chosen based on conversation with a telephone caller and the timing of transmission can be assumed, the operation support function will be realized, and the telephone caller can enjoy the Internet without any technical operation except making a telephone call.

Moreover, based on the telephone number of the caller side, customization of the data transmitted is also possible.

Internet use by elderly people can become more widespread, and it is also effective in a child's Internet education. Not only using the Internet as a hobby for the elderly, but elderly workers who are an unfamiliar with PC operation can perform electronic commerce with some support of business clients, and this will greatly contribute to social subjects, such as elderly people's employment promotion and osmosis of electronic commerce to a small business.

Even for those who are skillful in personal computer operation, many situations using the Internet without performing keyboard operations are assumed; for example, for those under hospitalization, cooking in a kitchen, in the bed, during meeting and reception with a customer, at the street corner while going out, while eating and drinking, etc., there are many situations and conditions where there is no keyboard or one does not want to move a hand. It can also be considered as a presentation method, such as calling an assistant and asking to send out some data while meeting a business client, and displaying it.

Additionally, it becomes possible that the information that is comparatively close to a request will be sent out with the support of the other caller, and thereby enhances interest against ambiguous information, etc., in which case it is easier to sufficiently access information.

When the situation arises which uses high-definition TV of the living room at home, such as choosing a movie, an environmental image, etc., from on the Internet, and having stream distribution carried out, as a monitor is assumed, although the environment does not get used to keyboard operation, it is assumed by the needs that presuppose television that the number of people who will want to tie to the Internet will increase substantially from now on. Based on this premise, TV sets will be equipped accordingly, and then the Internet function becomes possible with reference to voice communication and Push-Type Telecommunications.

It is not accompanied by keyboard operation, but this operation support function that enables use of the Internet by performing a telephone call and Push-Type Telecommunications simultaneously promotes greater realization of the so-called "ubiquitous" environment where everyone is connected with the Internet in all places.

Presentation Function

Since information is spontaneously sent out to the other party, and it is displayed on the other party's screen, without waiting for the request from a partner, one can also explain with sound, so appeal to the other party is markedly enhanced. Thus, it becomes possible to carry out a presentation to a partner just as though one is meeting directly with the partner, explaining, while data are shown, and answering, while hearing the opinion of a partner. If handwriting input equipment is used, handwriting input data can be sent out to the other party, and its explanation can also be heightened. In deployment of normal conversation, tempo or pause have great roles, and it is important to read a partner's thought(s). If a pause is chosen without obtaining comprehension of one's partner, information will still be displayed without the other party's prior request, offering a completely different, interactive communication from that afforded by today's conventional computers.

As a selling method, it is needless to say, broad uses, such as procedure, a method of consulting, an educational tool, goods, and service, registration, guidance and introduction of various information, and a questionnaire, are all assumed.

The Push-Type Telecommunications accompanied by a telephone call can be expected to create the new communication form, one which is completely different from today's telephone and Web browsing on the conventional Internet, in which information arbitrarily sent from the other party is seen visually. Moreover, using high-definition large-sized monitors, such as a large-sized TV screen in the living room, and a highly efficient speaker, the power of expression and presence will be remarkably enhanced, and can also be elevated, and it becomes possible to realize a new communication form at the point.

Theme Offer Function

In people's conversation, talk does not necessarily progress only by systematic logic deployment, and deployment of new talk is often drawn unexpectedly. For example, the usage with which one telephones while displaying data without the direct relation to the contents of conversation (for example, that it sends out and displays a grandchild's latest photograph, during conversation), in the case that one talks with their parents is assumed. This is quite a large volume of information of the variety of wanting to tell nonchalantly although it is not necessary to contact purposely in information. The various usages, which show the goods of its company in business, in which a researcher shows the latest research result, an individual expresses a hobby and volunteer activities are all assumed. A telephone caller not only sends out information actively, but the method of taking in a display and affiliate program of sponsor offer information is assumed.

Complement of the Conversation Using Vision Information

When sounds are hard to be caught, such as the cases where a different language is spoken, a telephone call involving a hearing-impaired individual, a telephone call spoken in a noisy environment of noise, etc., it becomes possible to promote an understanding by changing voice data to text format and it carries out a picture display.

The accuracy of speech recognition software is already over the standard greatly. It is in a level effective in expressing the processed text data on a screen as the method of combining automatic translation software with still inadequate accuracy at present and speech recognition software, and offering foreign language conversation support. Additionally, in this invention, on each terminal, exclusive software is unnecessary, and since there should just be a computer equipped on a network with the speech recognition function and the automatic translation function, it also becomes possible to use expensive software. Thereby, the conversation support service for foreigners and foreign language study service, which supports the conversation of overseas children and domestic children, are realizable.

Information Listing

When it telephones, although the extension number guidance by the automatic audio response system, for example, has often taken time only with the sound, if a list indication of the information is given at a monitor, response time can be reduced sharply. In case a customers claim is received, time shortening to correspondence induces positive ripple effects, such as an improvement in customer satisfaction. An enlarged character display for elderly people can also be performed.

Furthermore, in the information retrieval from a vast quantity of lists like a telephone directory-assistance service, the big screen monitor is effective. A request, then the said usage, is considered in delivery out of various menus. It also becomes possible to perform service quickly on the Web that is performed presently with a cellular phone, using a nearby large-sized monitor. It is effective as means of choosing information from secondary source data, such as a map, and showing around on a map.

Personalization Function

In this invention, it assumes mainly using a cellular phone as a telephone. Although the cellular phone is effective as a personalization method as mentioned above, when telling the other party an account number, for example, further, it becomes possible inputting an account number from a computer and telling a personal identification number by telephone, to maintain higher safety by using together with voice communication.

When you telephone an acquaintance, it cannot be overemphasized that factors such as voice and context of the other party are naturally understood and interpreted, and safety increases according to a sound and the contents of conversation. Moreover, carrying out direct conversation can also develop an enhanced sense of reliability. It combines with an operation support function and can apply also to various application procedures or a contract act.

Portability

In this invention, although the computer is used as the essential equipment that receives and displays information, a user may prevent thought from inputting at all, and it is difficult to produce the problem on management of a terminal. Therefore, performing Push-Type Telecommunications accompanied by a telephone call using the computer used by an unspecified user, and one's own portable telephone itself, is also possible. That is, if one has just a cellular phone, it can be said that the Push-Type Telecommunications accompanied by a telephone call can be attained anywhere.

Recently, fixed-rate telephone service, such as that offered with an IP telephone, has become increasingly widespread, so a users expense will become more economical by using a computer network and a telephone line simultaneously.

In addition, if a cellular telephone is utilized as a remote control device, since the input using a mouse or a ten key board is easy, it will be considered by the user that he/she approves, even if accompanied by a certain fixed input operation.

Service Using the Application on a Network

Various aspects of usage, such as a game accompanied by conversation, not only foreign language conversation support but mah-jongg, the game of go, shogi, etc., a note, a voice input, and voice operation, can be assumed. If a Web page is limited especially, contrast of text and sound is easy, and can offer the voice input function for an unspecified speaker.

Social Effect

As mentioned above, it is expected by being able to use always anywhere, even though it has the cellular phone, solving the problem of the so-called "digital divide" by the operation support function, or realizing some new usage, making the communication form nearer to the actual world of possibilities on a network, and producing various service forms that this invention promotes realization of a new ubiquitous social environment.

BRIEF EXPLANATION OF THE DIAGRAMS

FIG. 1: The figure showing the basic composition of the device of this invention, and the basic composition of the device of the form 1 of enforcement.

FIG. 2: The figure showing the composition of the device of the form 2 of enforcement.

FIG. 3: The figure showing the composition of the device of the form 4 of enforcement.

Figure 4:
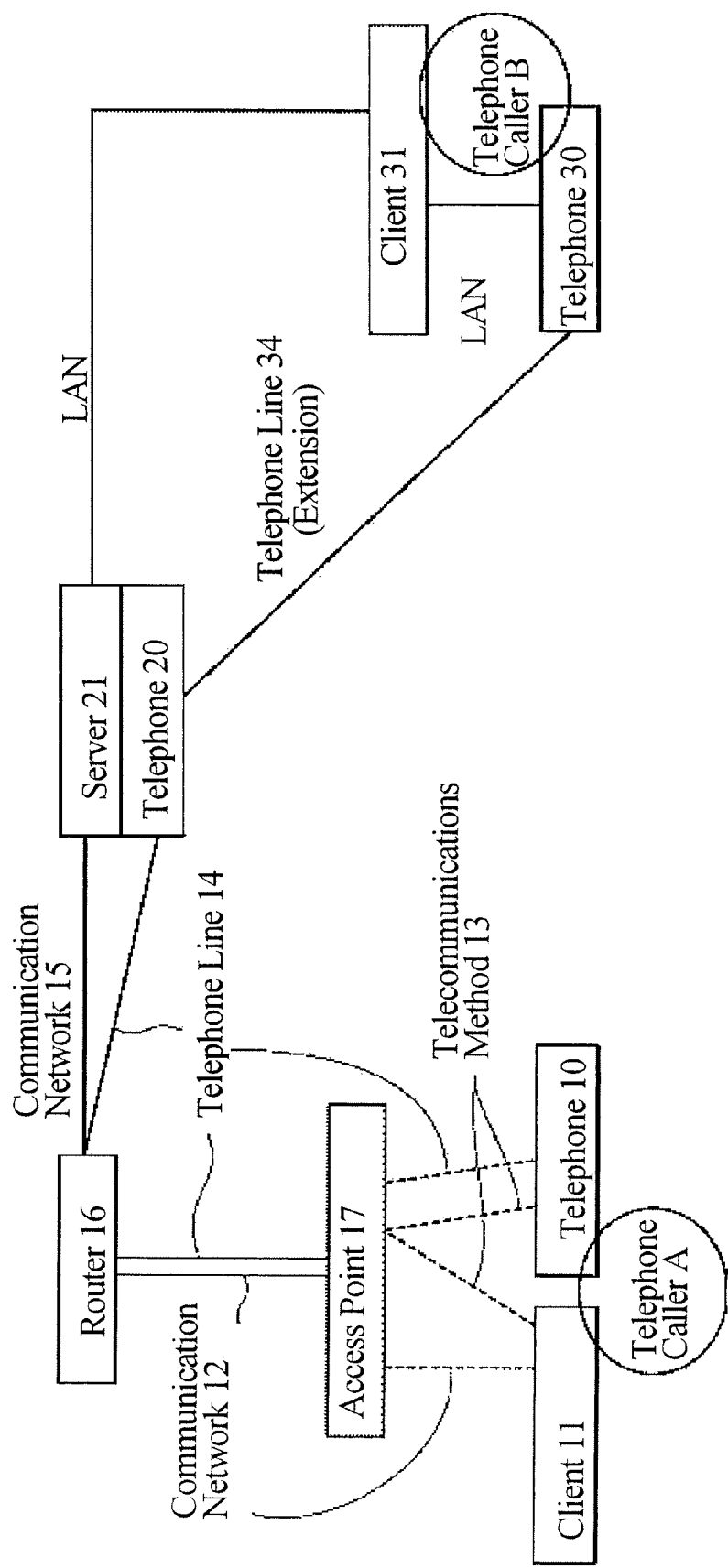

FIG. 4: The figure showing the composition of the device of a case of the operation 1.

Figure 5:
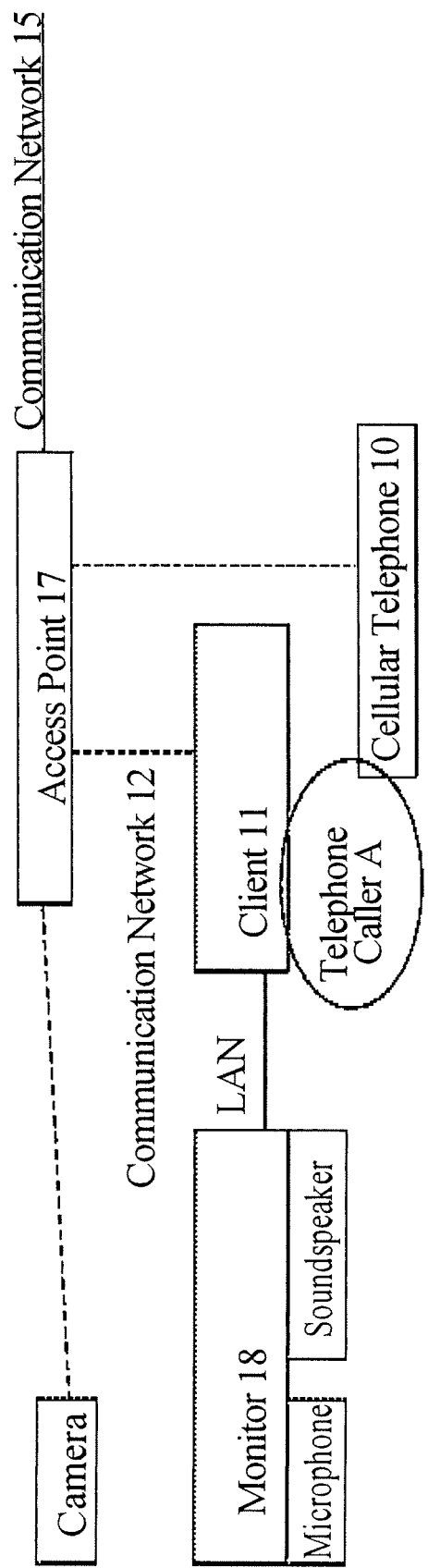

FIG. 5: The figure showing the composition of the device by the side of the service station of a case of the operation 3.

Figure 6:
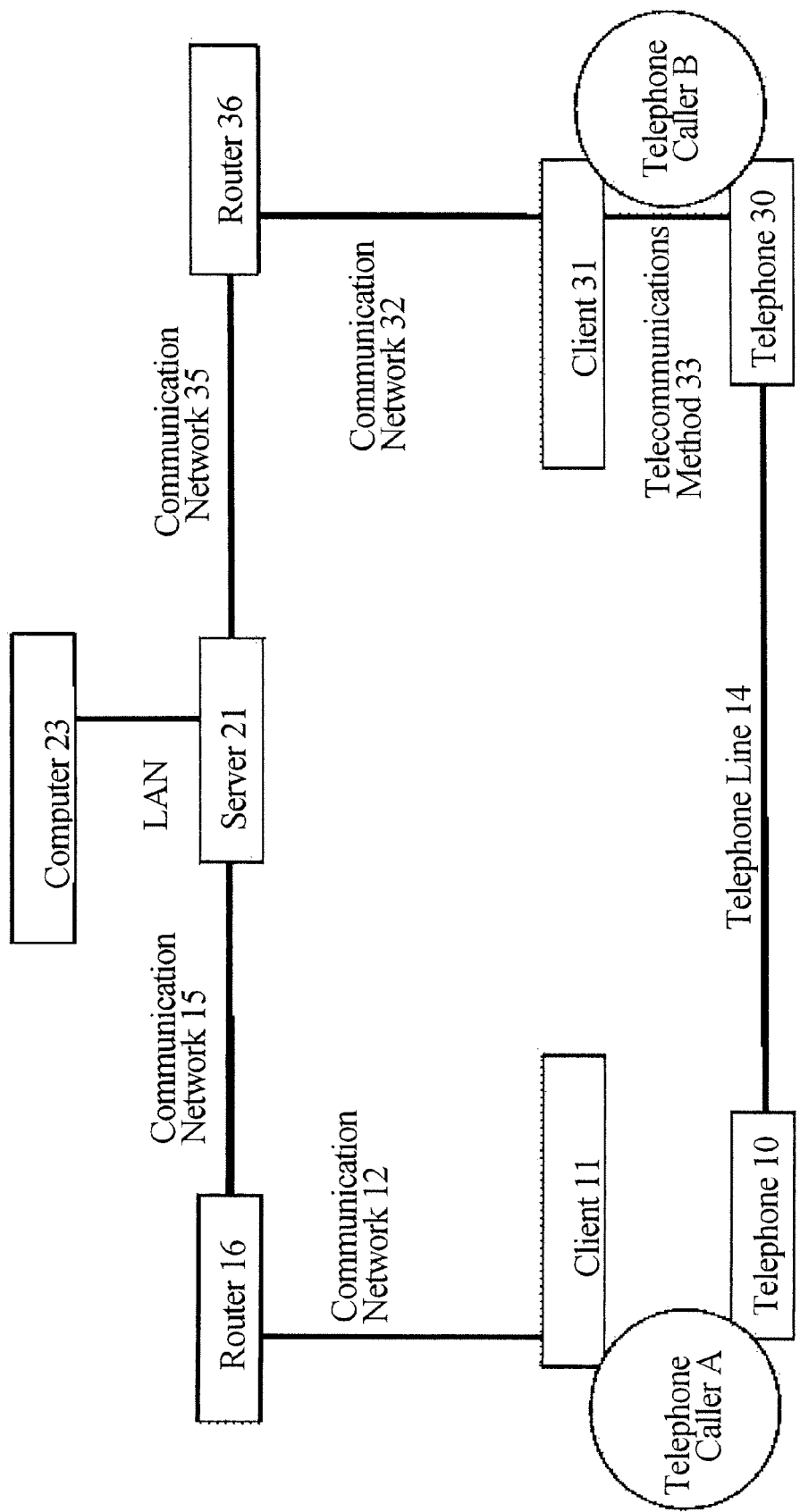

FIG. 6: The figure showing the composition of the device of the form 5 of enforcement.

Figure 7:
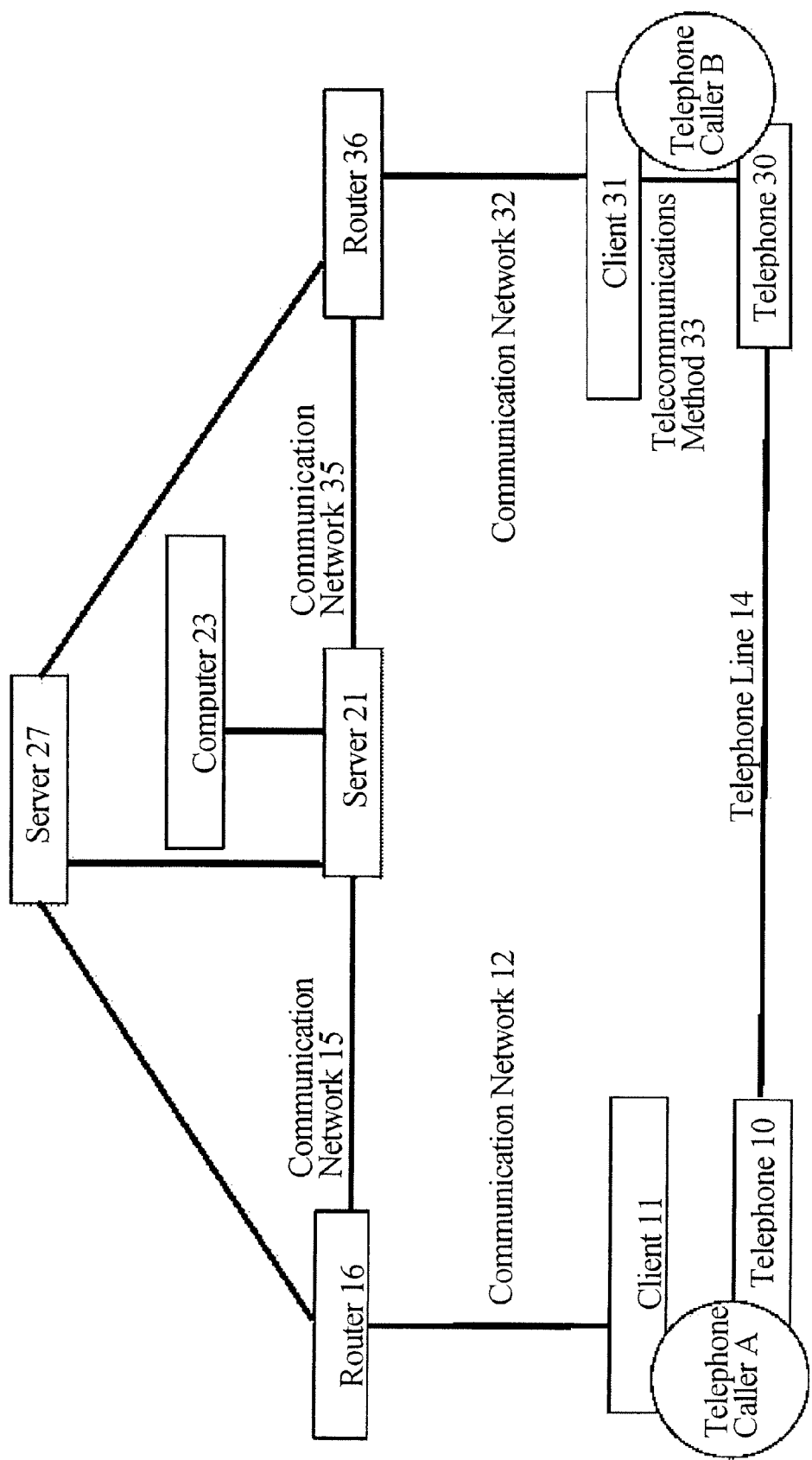

FIG. 7: The figure showing the composition of the device of the form 6 of enforcement.

Figure 8:
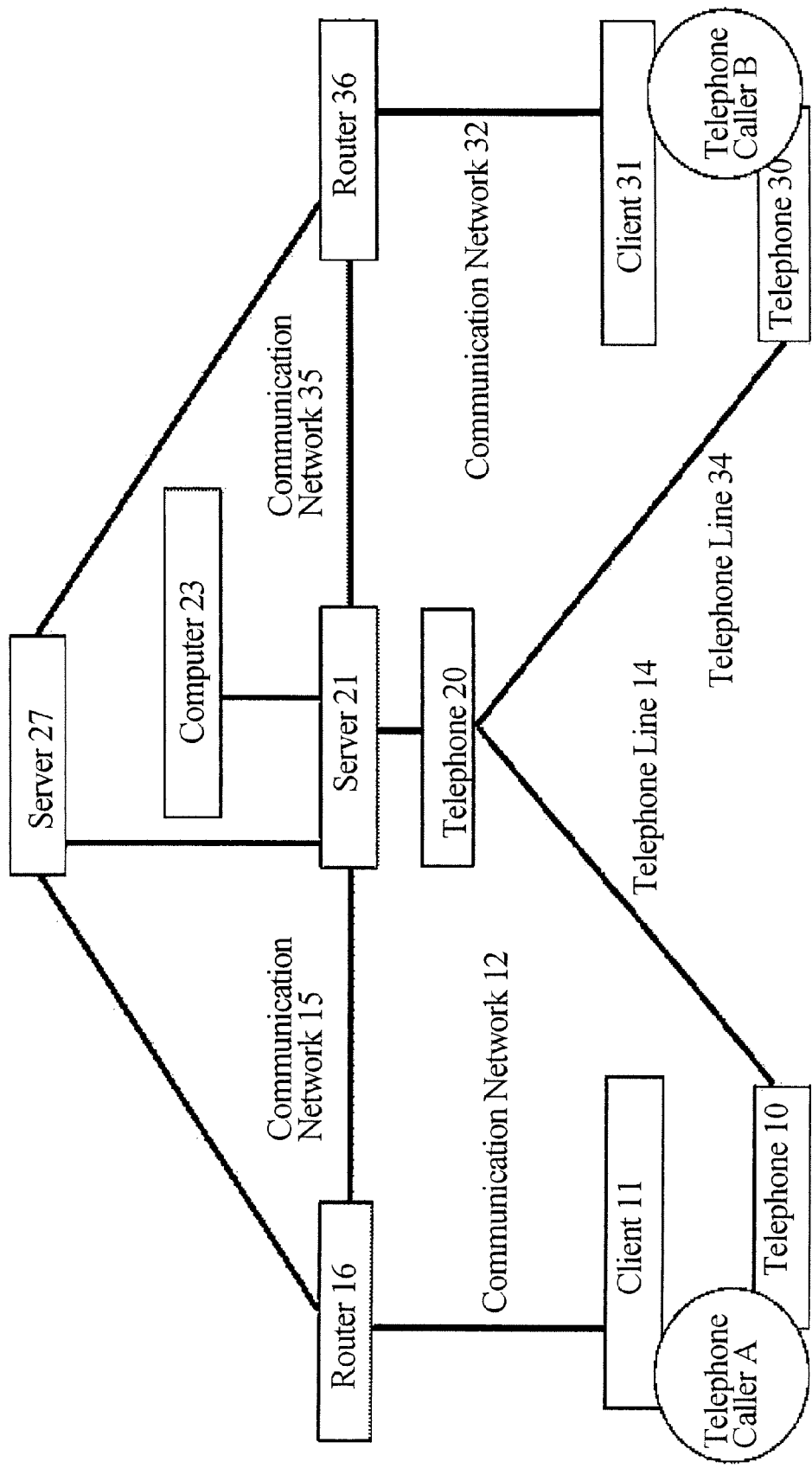

FIG. 8: The figure showing the composition of the device of the form 7 of enforcement.

Figure 9:
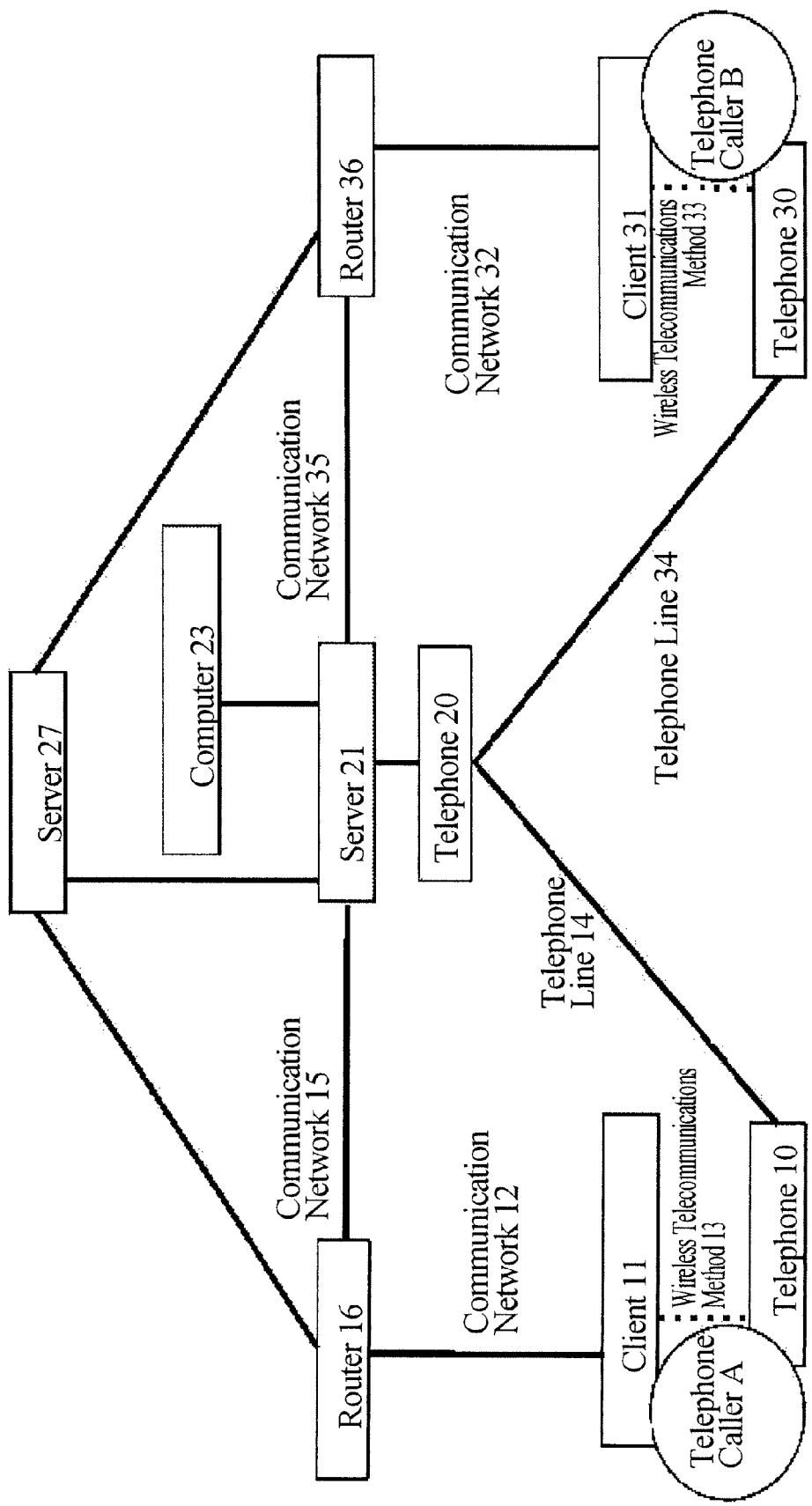

FIG. 9: The figure showing the composition of the device of the form 8 of enforcement.

Figure 10:
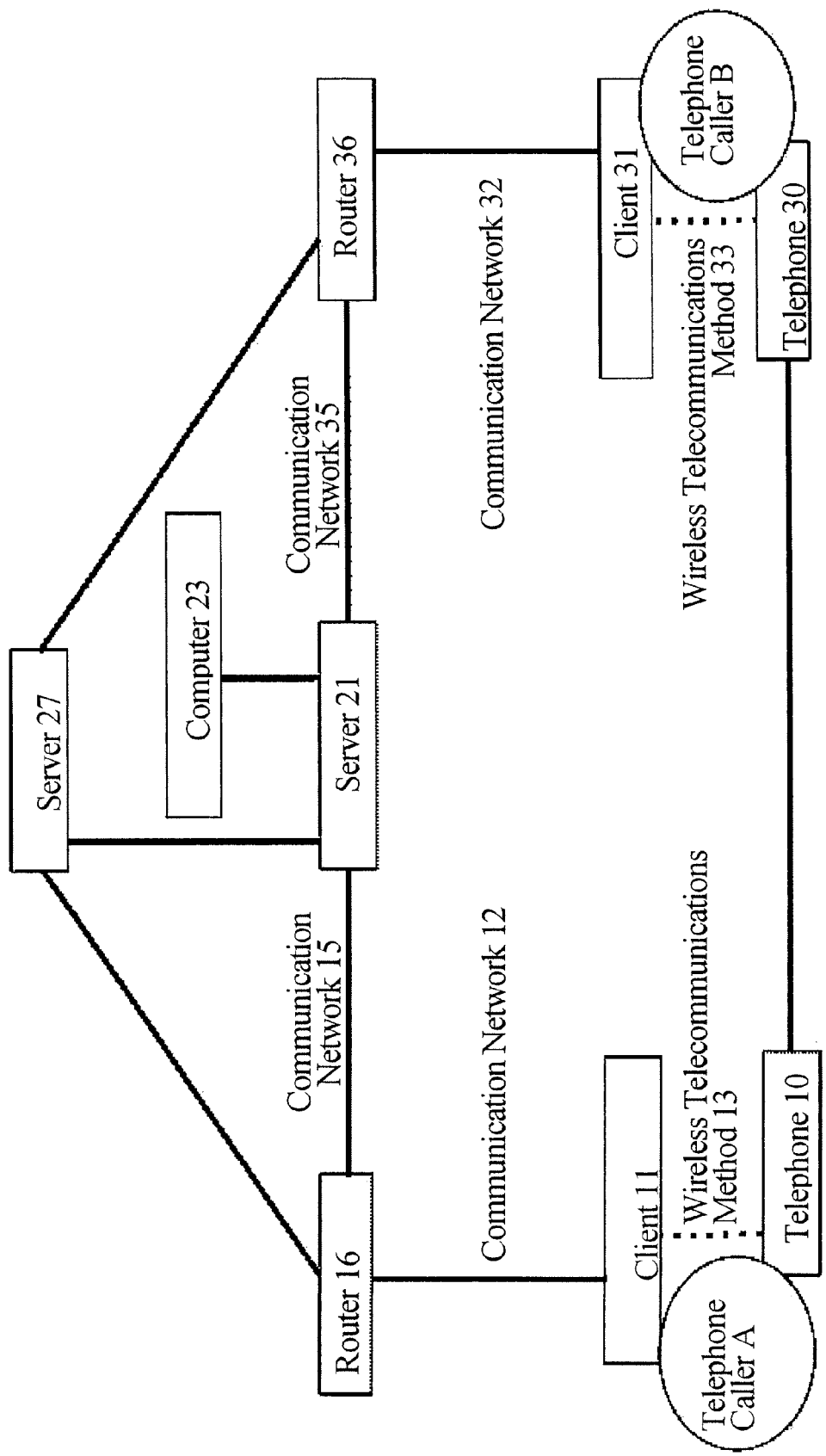

FIG. 10: The figure showing the composition of the device of the form 9 of enforcement.

Figure 11:
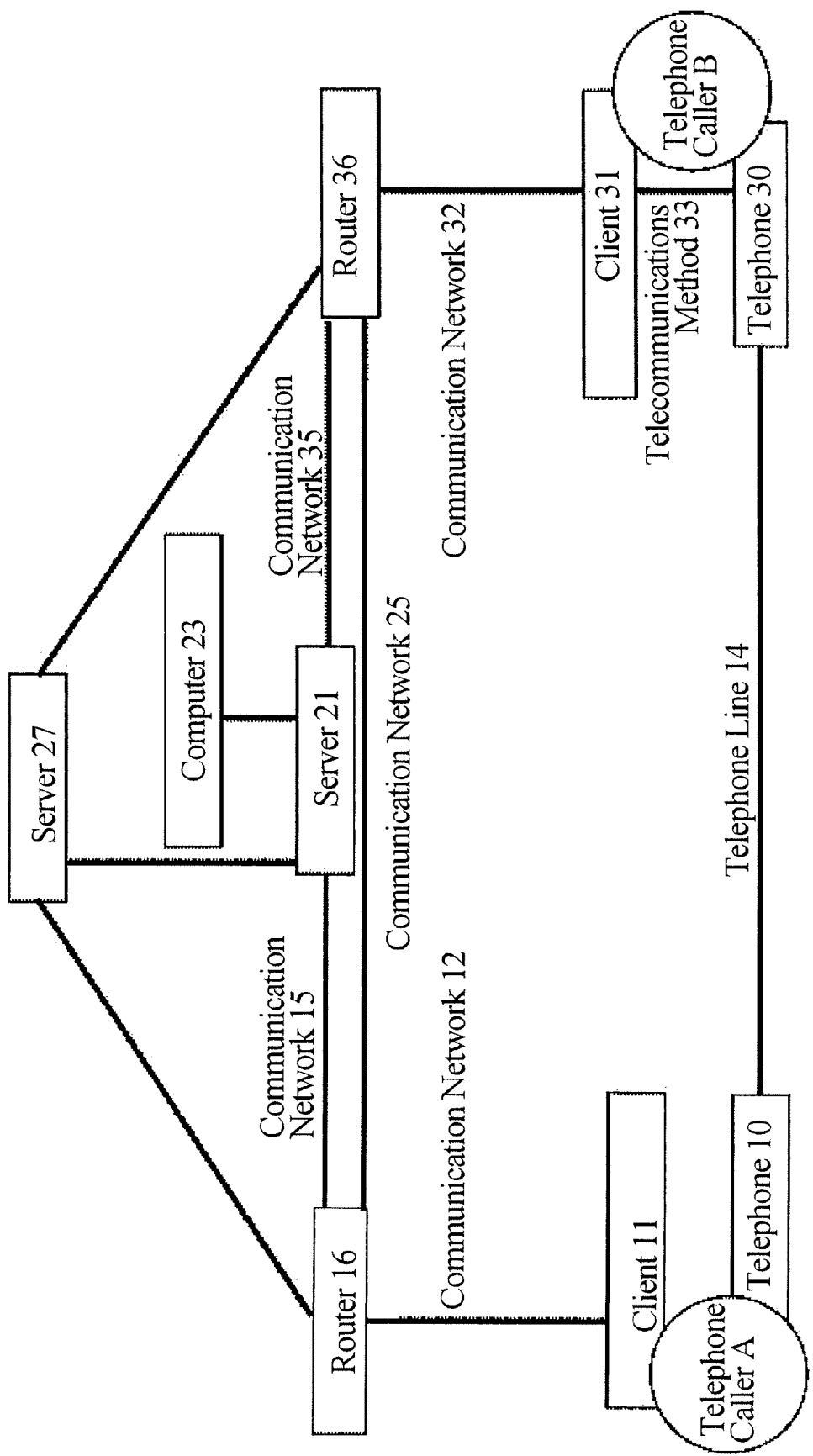

FIG. 11: The figure showing the composition of the device of the form 10 of enforcement.

EXPLANATION OF DIAGRAMS

10, 20, 30, 40 and 50 Telephone
11, 31, 41 and 51 Client (computer terminal)
21 Server used for Push-Type Telecommunications
23 Application Server
12 and 32 Communication Network between Router and Client
13, 33, 43 and 53 A Telecommunications Method to Connect a Client with Telephone
14, 34, 44 and 54 Telephone Line
15, 35, 45 and 55 Communication Network connected with a Public Internet Network
16 and 36 Router
17 Access point of Wireless LAN
18 Large-sized high-definition monitor

THE BEST FORM FOR INVENTING

The Form 1 of Enforcement

In FIG. 1, the telephone line shall be directly connected among telephone callers as in case 2.

Each client is connected to Server 21 through each Router, and the private address and port number of a client is carried out to a global IP address and a port number with each Router.

The Telecommunications network is the public Internet. Different telephone companies and different providers offer telephone services and Telecommunications network services.

Let the communication method between the clients and telephones which the Telephone Callers A and B use be the IC card with which telephones are equipped, and IC card reader writer with which the client is equipped.

A telephone caller connects to a Telecommunications network, after connecting the telephone.

Procedure 1: If Telephone 10 which Telephone Caller A uses calls Telephone 30 which Telephone Caller B uses, a telephone is connected and Push-Type Telecommunications agrees on the conversation between the Telephone Callers A and B, the negotiation process which determines the server used in Push-Type Telecommunications between Telephone 10 and Telephone 30 will go through, and Server 21 registered into Telephone 30 will be chosen. (You may choose the server registered into Telephone 10.)

In this process, a Push-Type Telecommunications command is generated in the computer by which a telephone caller uses Telephones 10 and 30 in parallel, respectively, and the telephone numbers of both telephones, the IP address of Server 21, etc., and a Push-Type Telecommunications command are written in the IC card of each telephone.

Telephone Caller A holds up the IC card side of Telephone 10 to IC card reader of Client 11, and Push-Type Telecommunications commands, such as an IP address of Server 21, such as the telephone numbers of Telephones 10 and 30, which Telephone 10 holds, are read and are sent off in Client 11. In Client 11, Push-Type telecommunications software starts, based on a Push-Type Telecommunications command, and the request message which indicated the Telephone 10 numbers concerned, and Push-Type Telecommunications selection commands are transmitted to Server 21. Suppose that it is also the same in Telephone Caller B.

In addition, the telephone is an Internet telephone, and it is assumed that the global IP address of the other party's telephone which each telephone acquires differs from the private IP address which each other party's telephone holds when it does not have the telephone number. Therefore, specific information is exchanged between both telephones, and Procedure 2 in Server 21 is compared as transmitting the specific information concerned on both telephones collectively to a client.

Procedure 2: Server 21 confirms having compared the telephone number indicated by the request message which arrived from Client 11 and Client 31, and having agreed, are that the Push-Type Telecommunications selection command is indicated, and starts the Push-Type telecommunications software. Additionally, the IP address of 11 and Client 31, the telephone number of Telephones 10 and 30, etc., are saved as a pair of data, and the initial screen that contained the form for information transmission in each client is sent as a response message.

Clients 11 and 31 carry out the picture display of the initial screen concerned from the response message of Server 21, and Push-Type telecommunications software generates and awaits a socket considers as a state, pinpoints an acceptance port, and receives only the packet in which a transmitting agency IP address agrees with the IP address of Server 21. Preparation of Push-Type Telecommunications is completed with the above procedure. Clients 11 and 31 emit the voice signal of the completion of preparation, and each telephone caller separates the respective telephone from the client, and holds the telephone in hand, ready for conversation to begin.

Here, the telephones are connected without Server 21, and the telephone of Telephone Caller A and Telephone Caller B is in a telephone line that a different company offers, and is in use utilizing the Telecommunications network. Although address conversion of the IP address of Clients 11 and 31 and the port number is carried out with Router 14 and 34, Server 21 compares the telephone number of both telephones received from Clients 11 and 31. To specify the partner of transmission and reception, in order to recognize it as receiving a Push-Type Telecommunications command and Push-Type Telecommunications being chosen between both telephone and a client, and a problem will not be produced.

Procedure 3: Each telephone caller talks.

Procedure 4: When one of telephone callers sends arbitrary information in arbitrary timing to other telephone callers while the conversation progresses, a telephone caller (here, temporarily considered Telephone Caller B) uses the form sent previously, or sends out Information f to Server 21 by the method of mail, etc.

Server 21, which received Information f, transmits the communication packet g that tells Client 11 about the timing of information transmitted while changing Information f into HTML document format, since transmitting agencies are Client 31. A transmitting agency checks that it is the IP address of Server 21, and the TCP/IP software of Client 11 passes the data of the communication packet g to Push-Type telecommunications software in the port appointed beforehand. Push-Type telecommunications software at that moment erases a socket, cancels the data of the communication packet g, and takes out the directions that transmit the request message which serves both as a check and an information claim to Server 21 to TCP/IP software.

Procedure 5: Client 11 transmits the request message, which serves both as a confirmation and an information claim. Description that specifies information as this request message is not indicated, but the IP address and port number for processing a HTML document are indicated by the header.

Server 21, which received the request message, compares with combined data which had already saved the transmitting agency IP address of a request message, etc., checks that Push-Type information is communicating, and transmits to Client 11 by making into a response message the data changed into the HTML document format concerned. If a response message is received, Client 11 will take out data, and will display or reproduce it on a screen by the browser.

Then, stand-by mode is activated after generating a socket again, a new IP address and port number become a transmitting agency, and the Push-Type telecommunications software of Client 11 transmits the request message which indicate stand-by mode and receiving to Server 21. Based on this condition, a response message does not return to Server 21.

Procedure 6: When a response message is the only single piece of URL information (in other words, the data that Telephone Caller B transmitted is the only single piece of URL information), the Push-Type telecommunications software of Client 11 at the moment erases a socket, acquires information given in URL from the Internet by the usual method, and displays or plays it on a screen by the browser.

Then, it goes into the state of stand-by like Procedure 5.

Procedure 7: In Procedure 5, Server 21 transmits an error message to it at Client 11, when the request message for an information claim is received, although information has not arrived from other clients.

Client 11, which received this error message, returns to the stage of Procedure 2, awaited as in Procedure 5, and goes into stand-by mode.

This operation is managed supposing the case in which a mistaken request message may be transmitted to Server 21 from Client 11, when a misleading packet (which deceives) about the transmitting agency IP address reaches Client 11. The code used as a key is exchanged and saved between Server 21 and Client 11 in the preparation stage of Push-Type Telecommunications. It may indicate in the message packet g and a request message, and you may use as a confirmation method at the time of Push-Type telecommunications software directing creation of a request message.

Procedure 8: Procedure 3 to Procedure 6 will be repeated.

Procedure 9: One of the telephone callers disconnects a telephone, and a telephone call is completed.

Unless a telephone with an integrated circuit card is held up to a reader writer, even if it disconnects a telephone, since the integrated circuit card is used for communication between telephone and a client, the signal of a telephone call end is not sent to a client.

For this reason, if a telephone is disconnected, a telephone caller will hold up the telephone with an integrated circuit card to a reader writer again, and will end Push-Type Telecommunications of a client.

However, since the case in which one forgets to hold up is also assumed, after transmission and reception of the last Push-Type information are performed, you may make it each client and Server 21 ends Push-Type Telecommunications automatically after passing over a certain fixed time.

If directions indicating an end of Push-Type Telecommunications come out, each client will transmit the request message that indicates an end to Server 21, will erase a socket, and will end Push-Type telecommunications software.

Server 21 cancels the combined data, such as a saved telephone number, ends Push-Type telecommunications software, and the complete Push-Type Telecommunications is terminated.

The Form 2 of Enforcement

In FIG. 2, Clients 11, 31, 41 and 51 are connected to Server 21 through a public Internet circuit. As for Clients 11 and 31, address conversion of the IP address is carried out with Router 16 and 36, respectively. Although Client 41 and Telephone 40 are a single computer device, and Client 51 and Telephone 50 are separate devices, they both have global IP addresses.

Server 21, Application Server 23, and Telephone 20 are connected with LAN. Telephone 20 has a telephone function using the automatic voice response function of Application Server 23. Moreover, there are various applications using an automatic speech recognition function and its output data in Application Server 23.

Each network service shall be offered by a different telephone company and a different provider. Short-distance wireless communications, such as wireless LAN with which telephone and the client were equipped or UWB, and Bluetooth, are used for the communication method between the clients and telephones which the Telephone Callers A, B, and D use. Hereafter, it is written as short-distance wireless communications.

With the form 2 of this enforcement, after connecting a Telecommunications network, it supposes that telephone is connected, and the timing of information transmitted of each client takes the method of telling other clients via a telephone line.

Procedure 1: Telephone Caller A accesses Server 21, browses the Web page Server 21 has, and registers the telephone number. Telephone Caller C, who similarly accessed the Web page and had registered the telephone number, is found by Telephone Caller A. Telephone Caller A expects Application Server 23 will be utilized using Push-Type Telecommunications together with Telephone Caller C, and the Push-Type Telecommunications button on a Web page is pushed.

Server 21 telephones to Telephone Callers A and C, and then both telephones are connected. Telephone Caller A talks to Telephone Caller C directly through Telephone 20, and suggests carrying out Push-Type Telecommunications. If both of them agree and push button operation is performed on Telephones 10 and 40, negotiation process between both telephones will be executed, and then a Push-Type Telecommunications command will be generated at Telephone 20, and a Push-Type Telecommunications command will be transmitted to Telephones 10 and 40, in addition to Clients 11 and 41 through short-distance wireless communications, and then Push-Type telecommunications software will be activated in each device.

If Telephone Caller A thinks that he/she wants Telephone Caller B to join the conversation, Telephone Caller A inputs Telephone Caller B's telephone number into form and transmits to Server 21, and it connects with Telephone 30 from Telephone 20. Telephone Caller B will perform an acceptance operation by Telephone 30, a Push-Type Telecommunications command, the IP address and a port number of Server 21 will be sent to Telephone 30 and Client 31, and Push-Type telecommunications software will start. Furthermore, if Telephone Caller C thinks that he/she wants Telephone Caller D to join the conversation, the IP address of Server 21, a port number, and a Push-Type Telecommunications command are all sent to Telephone 50 and Client 51, and Push-Type telecommunications software will be activated.

Furthermore, Client 31 and 51 transmit request messages that include information such as the telephone number for each Telephones 30 and 50, by Push-Type telecommunications software to Server 21, and Server 21 saves by making the IP address of each telephone caller's client, etc., the telephone number of telephone, etc., into a pair. Each telephone is now able to begin conversation mutually through Telephone 20.

Procedure 2: If Server 21 transmits a specific signal or specific information to each telephone from Telephone 20, each telephone which received this information will transmit to each client through short-distance radio, etc., and each client will transmit this to Server 21. When the same thing as the transmitted signal or information comes back, Server 21 can confirm that each telephone caller is using telephones which Server 21 combines and saves the information, such as a client of an IP address and a telephone number. Then the confirmation of the starting signal of Push-Type Telecommunications is transmitted to each telephone of the telephone callers.

After this takes place, the same signal as this signal is transmitted to each telephone. It is transmitted to a client, each client knows the timing of information reception by it, and the request message of an information request is transmitted to Server 21 from each client, and supposes that each client acquires information. By the request message based on the first signal, Server 21 sends the form that contains the initial screen in each client as a response message.

Each client displays an initial screen on a monitoring screen from the response message that was received from Server 21. The preparation that performs this aspect of Push-Type Telecommunications with the above procedure is completed.

Procedure 3: Telephone caller of 1 uses a form. When the request message indicates that the specific application H of Application Server 23 is transmitted to Server 21, Server 21 transmits a signal to each client through each telephone from Telephone 20, and each client transmits a request message to Server 21. By this response message, the questions of usage of the specific application H of Application Server 23 are displayed on the screen of each client. Each telephone caller answers this question, and Server 21 starts using the specific application H of Application Server 23.

In the form of this enforcement, although the telephone line and Telecommunications network which the Telephone Callers A, B, C, and D use are offered by different companies respectively, if a signal or URL information on information transmitted, etc., can be transmitted through a telephone line from Server 21, a problem will not be produced. Additionally, the point by which address conversion is carried out with the Router does not become a problem, either. The signal of information transmitted could also be a specific voice pattern.

Procedure 4: The specific application H of Application Server 23 starts, and each telephone caller talks.

Procedure 5: When you perform personalization using a voiceprint, suppose that each telephone caller registers his/her voice data into Application Server 23 in advance. Application Server 23, which received each telephone caller's voice data, cuts down some voice data between telephone callers, compares with the voiceprint of each telephone caller beforehand registered using voice confirmation software, notifies the output result to each client as in Procedure 2, and is taken as the personalization function between telephone callers.

Moreover, since Server 21 holds the telephone number of each telephone, it can be considered as a certain personalization function by notifying other of this telephone number.

Procedure 6: Each telephone caller's sound is sent to Application Server 23, and is changed into text data by speech recognition software at the same time it is transmitted to each of the other telephones through Telephone 20. In the specific application H, computer processing of the converted text data is carried out. In this processing, when the specific application H includes automatic translation software, etc., the processing which divides all voice data for every clause is made, and it is identical each time. The signal of information transmission is transmitted to each client through Telephone 20 and each telephone from Server 21, and the text data translated for every clause is sent to Server 21. In the case of game software, etc., the specific application H processes some text data generated from voice data or voice data as a command on game advance. While advancing a game and sending the screen data of the result that advanced to Server 21, generating of a command is notified to Server 21 and Server 21 transmits the signal of information transmitted to each client through the telephone. Server 21 changes into HTML document format the data received from Application Server 23.

Procedure 7: Each client that received the signal of information transmission sends out the request message for a confirmation and an information request to Server 21. The output data concerned of the HTML document format received as the response message is displayed or played on a screen.

Procedure 8: As mentioned above, the conversations of Procedure 4, Procedure 6, and Procedure 7 are repeated, and Push-Type Telecommunications accompanied by the conversation using applications, such as a translation text display and a game, is performed.

Procedure 9: When ending an application, the request message as in which the telephone caller of 1 requests an end from a client using form, etc., is transmitted to Server 21, and Server 21 stops the voice data transmission to Application Server 23, and terminates the application concerned. In this state, the telephone between each telephone caller is still connected.

Procedure 10: Although it carries out like the form 1 of enforcement when continuing Push-Type Telecommunications among each telephone caller, the method of notifying the timing of information transmitted to a client is based on the signal of information transmitted which Server 21 sends out to each client through Telephone 20 and each telephone caller's telephone.

Procedure 11: After the telephone caller of 1 disconnects a telephone and a telephone call is completed, the telephone caller's telephone notifies that to the telephone caller's client by short-distance wireless, etc., and each client transmits the request message which tells an end to Server 21, and ends Push-Type Telecommunications by terminates Push-Type telecommunications software. Combined data, such as a telephone number that has been saved at Server 21, are canceled, Push-Type telecommunications software is terminated, and Push-Type Telecommunications ends.

The Form 3 of Enforcement

With the form 1 of enforcement, the method of telling a client about information transmission directly from Server 21 was taken using the integrated circuit card and the reader writer. Additionally, although the client was notified about the timing of information transmitted via the telephone line using short-distance wireless, etc., with the form 2 of enforcement, it could be taken as the method of telling a client about information transmission directly from Server 21 using, for instance, short-distance radio.

The Form 4 of Enforcement

The form of enforcement in case there is no communication method between the telephone and a client will be described.

As shown in FIG. 3, Client 11 is connected to Server 21 through Router 16, and address conversion of the private address and port number of Client 11 is carried out to the global address and the port number with Router 16. Communication Network 15 shall be used as a public Internet network, and service shall be offered by the telephone company and provider from whom Telephone Line 14 and Communication Network 15 differ. Server 21 and Client 31 shall be connected in LAN, and 34 shall be connected by the telephone line extension.

Procedure 1: Client 11 shall be started beforehand, shall access Server 21 by Push-Type telecommunications software, and shall be in the state where Server 21 acquired the IP address of Client 11, etc. Moreover, the information shall be transmitted from Server 21 to Client 31.

Procedure 2: If Telephone Caller A telephones Telephone 20 using Telephone 10, Telephone 20 will be connected to Telephone 30 based on the telephone number of Telephone 30 registered in advance.

In addition, when Telephone 20 has not registered the telephone number of Telephone 30, the telephone number of Telephone 30 will be notified to Telephone 20 by Telephone Caller A's voice, or through button operation.

Procedure 3: If Telephone Caller A reads out the number currently shown as Client 11 by the sound, since he can narrow down the candidates of Client 11, Telephone Caller B transmits the number or code which is different through Server 21, for the candidates of each who have already been narrowed down. Telephone Caller A reads it out, and specifies Client 11. In addition, operation of this Telephone Caller B may be made to be performed automatically using speech recognition software.

Procedure 4: Telephone Caller A and Telephone Caller B converse.

Procedure 5: If Telephone Caller B sends out new information to Server 21 by Push-Type telecommunications software, Client 11 will acquire the information concerned and will display it on a monitor.

In addition, the speech recognition software that does not depend on operation of Telephone Caller B, but Client 31 is equipped to recognize a part of Telephone Caller A's sound as a command, and a link place is made to choose and link out of the information displayed on Client 11 or the special screen that scrolls a screen may be displayed, and a sound may be converted to text, may be displayed, or the user may create e-mail, etc.

Procedure 6: Procedures 4 and 5 above are repeated.

Procedure 7: If Telephone Caller A disconnects a telephone, Push-Type Telecommunications will be terminated.

In addition, when Telephone Caller A telephones directly to Telephone Caller B without Telephone 20 as this variation like the FIG. 3 case 2, even if Server 21 is an arbitrary server on the Telecommunications network that is not connected with LAN to Client 31, if the premise of Telephone Caller B operating it is carried out or between Client 31 and Telephone 30 is connected with LAN or the wireless communications method, the Push-Type Telecommunications accompanied by the telephone call between both will be attained.

Beforehand, the telephone number of Telephone 10 becomes the IP address of Server 21, etc., and are combined and registered into Client 31. It is possible with a sound to specify the IP address of Server 21 which Telephone Caller B should access with such a method, so as to transmit the ID and the password which were displayed on the IP address of Server 21 and Client 11, etc., and this process can also be automated.

It is also possible to make it require only one telephone number input operation in Telephone Caller A about the process of telephoning Telephone 20 from Telephone 10 and connecting to Telephone 30. It is possible to connect Telephone 10 with Telephone 20 indirectly through Telephone 30, or when it has been recognized as the telephone number of 30 already registered telephones, etc., you may make it connect with Telephone 30 through Telephone 20 on the relay base in the middle of a telephone line in the above-mentioned explanatory note.

The Form 5 of Enforcement

In FIG. 6, the communication method is not equipped between Client 11 which Telephone Caller A uses, and Telephone 10, Telephone 10 assumes usage of a typical (normal) fixed-line telephone machine or a typical portable telephone (mobile telephone). Telephone Caller B assumes the call center has the appropriate computer telephony system, etc., and Client 31 and Telephone 30 to be used are connected by the communication method.

According to recognizing correspondence relations which Telephone Caller A and Telephone Caller B use, such as an IP address of a client, etc., and a telephone number of telephone, in Server 21, and the fact that Push-Type telecommunications software started, while Telephone Caller A and Telephone Caller B use the existing telephone by distinguishing that it is going to perform Push-Type Telecommunications accompanied by a telephone call, transmitting the information transmitted from one side to another side, and indicating by the monitor automatically, Push-Type Telecommunications accompanied by a telephone call is enabled.

Procedure 1: Connection of a client and telephone

Telephone Caller A accesses Server 21 from Client 11 while calling Telephone 30 of Telephone Caller B from Telephone 10. For example, the situation in which the television viewer who was watching a TV commercial accesses URL specified from the personal computer, etc., while telephoning a sponsor company, is assumed.

Procedure 2: Comparison of an IP address and a telephone number

As a response to the access, arbitrary specific codes are transmitted to Client 11 from Server 21. Then, Server 21 saves by combining the IP address of the client which is the transmission place of the specific code and a specific code.

From Telephone 30 that received the telephone, voice data and the telephone number of Telephone 10 is transmitted up to Server 21 via Client 31.

Telephone 10 caller A reads out the specific code concerned that is sent from Server 21 and displayed on a monitor, the sound is transmitted to Server 21 via Telephone 30, and text data is formed by Computer 23 which has a speech recognition function, and then it is compared with the specific code Server 21 previously transmitted to Client 11. The telephone number of Telephone 10 which has an audio dispatch origin is recognized as combined to be the IP address, saved by carrying out at the specific code and pair, and an IP address of Client 11, which Telephone Caller A uses and a telephone number of Telephone 10, etc., become a pair, and are saved at a Server 21.

This process is also effective for checking repeatedly.

In Client 11 and Client 31, Push-Type telecommunications software starts simultaneously with access to Server 21, and the condition that it has already started is transmitted to Server 21.

An IP address of Client 31 that Telephone Caller B uses and a telephone number of Telephone 30, etc., are recognized as a pair in Server 21, it is confirmed that Telephone 10 and Telephone 30 are presently conversing over the telephone, and the Push-Type Telecommunications accompanied by a telephone call is started.

Procedure 3: Grasp of the Timing of Information Dispatch

Telephone Caller B transmits subjective information to the arbitrary timing considered to be effective in conversation with Telephone Caller A to Server 21 from Client 31. The method of this information transmission may be performed using arbitrary forms from a browser, and mail may be used for it. Also, it is effective by other methods, for example, the URL that shows the whereabouts of the data on a network is transmitted, and Server 21 is made to acquire.

Since Server 21 receives data while it is performing Push-Type Telecommunications accompanied by a telephone call when certain data is received from Client 31, it transmits the packet that tells Client 11 about having received information.

Client 11, which had generated the socket beforehand, judges that Server 21 is preparing data transmission from the fact, generates a new socket, and transmits the request message requiring data of Server 21 while erasing a socket, after checking the fact of having received the packet.

When Server 21 receives information from Computer 23 and transmits to Client 11, it could be the same way.

If the method of information transmitted is the form that can receive the Push-Type telecommunications software of Client 11, it is effective with subjective means. In this case, it may change and send document format suitably so that the information Server 21 received opens an attached file, extracts only inner information, rewrites it in a HTML document, etc. By other methods, Client 11 catches the timing of information transmitted, sends empty mail to Client 11 from Client 31, and, in the present condition, it is not guaranteed that the mail is actually distributed in real time.

Although the method of sending information to Client 11 directly from Client 31 using mail can also be taken, an attached file is transmitted, and when it is considered as the method of opening automatically and displaying, it will be necessary to prepare the function to exterminate the virus infecting the attached file, spy wear, etc., in Client 11.

Procedure 4: Informational Acquisition, Display, and Disconnection

Server 21 transmits the information received from Client 31 or Computer 23 to Client 11, and Client 11, which received this, displays the information concerned on a monitor.

Operation of each of these above clients, as well as Server 21, is carried out with the Push-Type telecommunications software working in each device. In Server 21, if disconnection of a telephone is notified through Client 31 from Telephone 30, the directions that terminate the function of Push-Type telecommunications software will be taken out from Server 21 by each device, and Push-Type Telecommunications will be completed. On the telephone, disconnection will effectively close this software.

Hereafter, the process of disconnection will not be described, since it is effectively the same.

Screen Operation with a Sound:

Client 31 continuously transmits the voice data that Telephone 30 received to Server 21, and Server 21 transmits this to Computer 23, and transforms it into text data by the speech recognition function. Additionally, Server 21 also sends the data sent out to Client 11 to Computer 23.

Moreover, the text data of the specification fixed in advance that Server 21 sent out to Client 11 and made the monitor display is sent as a voice command and saved to Computer 23. The specification of this voice command shall be programmed to perform a certain operation into the Push-Type telecommunications software of Computer 23.

As for the specification of a voice command, it is desirable to determine that operation is generally easy to presume from the name.

In order to recognize it as the sound inserted into the usual conversation clearly, as it was called "command OO", conversation can usually protect misconception by making into a voice command language which is not used.

Server 21 transmits a certain HTML document to Client 11, when it is displayed on the monitor linked to Client 11, Computer 23 holds the HTML document data currently displayed on the monitor linked to Client 11 since the number of links put on the identical text document is limited, if the sound which Telephone Caller A uttered reaches Computer 23 which has a speech recognition function via Telephone 10, Telephone 30, Client 31, and Server 21, even if Computer 23 is a telephone voice with an unspecified person's voice data, they can distinguish the sound(s) that Telephone Caller A uttered with high recognition accuracy.

If specific language, such as "Go", "Return", "right", and "top", is beforehand registered as a voice command, it will also become possible to operate a screen and cursor with Telephone Caller A's sound.

When the HTML document which the Server 21 transmitted is a map, when it has been recognized as Computer 23 being in "map modes" then the sound of limited kinds, such as "1/20,000", "1/200", "500 m north", and the "cursor 10 cm right", is recognized, expansion and the reduced map are newly transmitted via Server 21, or the position of cursor is moved.

When the HTML document that Server 21 transmitted is a picture and an explanatory note of goods, and it has been recognized as Computer 23 being in "shopping mode", the sound of limited kinds, such as "photograph expansion", the "2 rights", "OO (brand name)", "purchase", and "OO (category) selection", is recognized, sending the expansion picture of goods, it puts on a purchase list, or a detailed goods list is shown.

As mentioned above, the mode is specified according to the contents of the HTML document which Server 21 transmitted, namely, since the number of voice commands and the volume of the language that should be recognized by changing a kind can be limited, even if it is a telephone voice speaker with an independent sound, Computer 23 recognizes the sound that Telephone Caller A has uttered with a high state of accuracy, and it enables Server 21 to transmit automatically the data for which Telephone Caller A requested to Client 11.

When performing a foreign language automatic translation text display, Computer 23 is recognized to be in its "foreign language automatic translation text display modes" with some procedures, such as using a voice command, text conversion and automatic translation are performed, and Server 21 transmits the text data after translating into the client of the other party of the speaker who uttered the sound(s), or both sides. You may make it consider in this case that specific language, such as "a command automatic translation stop" is voice command. In case Telephone Caller A's sound is transmitted to Server 21 from Client 31, a specific tag is attached to a packet and Telephone Caller A's voice data and Telephone Caller B's voice data are distinguished.

In addition, in order to distinguish more correctly whether the sound which Telephone Caller A uttered is only regarded as a sound, or it regards as a voice command, you may fix it that it attaches the specific language like a "command" before a voice command. Additionally, the voice command used well on a screen may be indicated by the text, and utterance of a voice command may be supported.

Telephone Caller B may perform same operation.

In addition, it may put putting a part or all of a function of these Computer 23 on a front end, etc., on the arbitrary positions on a Telecommunications network, and you may constitute a system so that the same use may be brought about as a whole. Hereafter, in every enforcement form, it is the same.

Individual Authentication:

Since a telephone line separate from a Telecommunications network is used in parallel (at the same time) in Telephone Caller B, Telephone Caller A can be specified to some extent by the telephone number of Telephone 10. It can also compare with Telephone Caller A's voiceprint which Telephone Caller B acquired beforehand and saved to Computer 23.

Furthermore, in Telephone Caller A, it becomes possible to tell Telephone Caller B personal information, such as address and a credit card number, with a sound, without minding a public Internet network.

Moreover, it becomes possible to offer a safer personalization procedure by combining the voiceprint analysis result of ID that has been transmitted through the public Internet network, the password that has been revealed through the telephone line, or a sound, and performing personalization procedure.

Therefore, higher levels of safety maintenance are attained. When Computer 23 is equipped with the voiceprint analysis function, Telephone Caller B transmits Telephone Caller A's voice data, Telephone Caller A's voice sample (acquired beforehand) to Computer 23 through Server 21, and Client 31 receives the result in which Computer 23 carried out analysis collation by Server 21. It can also carry out an effective confirmation operation.

Additionally, the information customized according to a telephone caller's characteristic can be sent out.

Furthermore, like screen operation with a sound, this personalization function may be put on a front end, or you may constitute a system so that a router may be made to bear the function.

Preservation of Data, Extraction, and Transmission:

By the computer operation and the personalization function by the voice command, it can also make it comparatively safe to save individual data on a network, or to choose arbitrary information from an individual data file, and to transmit the information currently displayed on the monitor to an individual cellular phone.

If personalization ends, Client 31 will tell that to Server 21. If Telephone Caller A emits the voice command meaning save, Computer 23, which received this and recognized to be "save" commands, and the data is sent out to Client 11 at the latest and is saved in the individual holder of Telephone Caller A of Computer 23.

If Telephone Caller A emits the voice command meaning the display of individual data, such as "my document" command, then Computer 23 transmits and displays the file list in the individual holder of Telephone Caller A who saved on Client 11. Filing it with which Telephone Caller A chooses a sound, it will be sent out through Server 21 from Computer 23 out of the list, and they will be displayed on the monitor of Client 11.

If Telephone Caller A emits the voice command meaning the data transmission to a cellular phone, Computer 23 will be similarly recognized to be the above, the data currently then displayed on the monitor will be attached to E-mail as an attached file, and mail will be transmitted according to the address beforehand registered into the individual holder of Computer 23.

Transmission and Reception of a Prior Information File Save:

Since a Telecommunications network is used intermittently, there is much time spent only talking on the telephone, and not transmitting and receiving information.

It was also able to be said that the time to a display was shortened by transmitting the information file considered for availability to be high using this time, saving at the client by the side of reception, transmitting only a file name from the client by the side of transmission when required, and displaying by the client by the side of reception.

The Form 6 of Enforcement

In FIG. 7, the communication method is not equipped between Client 11 that Telephone Caller A uses like FIG. 6, and Telephone 10.

Server 27 is prepared in order to be that all clients access Server 27 first, to determine Server 21 to be used and to compare correspondence relations, such as an IP address of a client, etc., and a telephone number of telephone, in case Push-Type Telecommunications is used, in order to serve the Push-Type Telecommunications accompanied by a telephone call for large and various servers and clients. In a certain meaning, it is equivalent to a role like DNS of the Internet. Here, the thing used in order to fix a communication form, such as choosing the Telecommunications Method that does not use Server 21, is also assumed.

Therefore, the IP address which should access any client first becomes the same, and if the client that a telephone caller uses is equipped with Push-Type telecommunications software, the Push-Type Telecommunications accompanied by a telephone call will be attained only by starting the Push-Type telecommunications software of a client at the same time a telephone caller telephones.

This enables Push-Type Telecommunications accompanied by a telephone call in a very easy (simplified) operation of the variety of simply pushing the button, which starts Push-Type telecommunications software using home electronics, such as a television linked to the Telecommunications network, in addition to an operation which telephones.

Procedure 1: Connection of a client and telephone

Telephone Caller A starts the Push-Type telecommunications software of Client 11 while calling Telephone 30 of Telephone Caller B from Telephone 10. By Push-Type telecommunications software, Client 11 accesses Server 27 automatically.

When Telephone 30, which received the call from Telephone 10, connects a telephone line, this is told to Client 31, and Client 31 accesses Server 27.

From Telephone 30, which received the call, goes via Client 31, and is the telephone number of Telephone 10, etc., the telephone number of Telephone 30, which became the IP address of Client 31, is combined and transmitted up to Server 27.

Server 27 determines Server 21 which offers the Push-Type Telecommunications service on a Telecommunications network or Server 21 are determined based on the IP address specified from Client 31 at the time of access, and the address of the Server 21 concerned, etc., is told to Client 31.

In this stage, since all the clients cannot distinguish in Client 11 when Server 27 has received access from many clients, since matching of the telephone number of Telephone 10, the IP address of Client 11 has not been performed, the IP address of Client 11, etc., cannot be transmitted to Server 21.

The telecommunications software of Client 31 makes Client 31 access Server 21 based on the IP address of 21 acquired servers, etc.

When this invention is put into practical use, it is the procedure set up on the network supposing the server of a large number that bears the function of Server 21 existing. A service offer company—if it assumes that the functions of Computer 23 linked to Server 21 differ—will think it natural to assume that various servers that bear the function of Server 21 consist on a network.

In addition, it is also effective as two or more servers on a network are cooperating and bearing the function of this Server 27.

Procedure 2: Collation of an IP address and a telephone number

Server 27 responds in specific arbitrary codes at the time of access from Client 11. The IP address of Client 31 and the telephone number of Telephone 30 are used as the pair, the IP address of the client of the above-mentioned specific code and its transmission place, etc., are combined, Server 27 are sent these to Server 21, and they are saved in Computer 23.

Telephone Caller A reads out the code concerned sent from a Server 27 and displayed on the monitor of Client 11, the sound is transmitted to Server 21 via Telephone 30 and Client 31, and it is converted into text data by Computer 23, which has a speech recognition function. It overlaps, and although described, the information that Telephone 10 and Telephone 30 have connected is also told to Server 21 from Client 31.

Computer 23 sends that which has been converted into text data, the sound read out as the telephone number, etc., and the specific code concerned of Telephone 10 to Server 27 via Server 21. In Server 27, the IP address of Client 11, etc., is deduced from the specific code that agrees with the text data concerned, and the IP address of Client 11, etc., is told to Server 21. Telling the IP address of Server 21 to Client 11, Client 11 accesses Server 21 by Push-Type telecommunications software.

In Server 21, an IP address of Client 11 and a telephone number of Telephone 10, the IP address of Client 31, etc., and the telephone numbers of Telephone 30, etc., are recognized as a pair, respectively, and since it is confirmed that the telephone line of Telephone 10 and Telephone 30 is connected, matching of each client and each telephone is completed.

In Server 21, simultaneously, it can check that Push-Type telecommunications software has started in both clients and since it can also check that it is under telephone call, it is considered that the recognition procedure to which Telephone Callers A and B agree on Push-Type Telecommunications by this was completed. You may take other arbitrary methods, such as regarding the fact itself that called the specific telephone number as a recognition procedure.

Telephone Caller A is only starting Push-Type telecommunications software and reading out a specific code, and it becomes possible to use Push-Type Telecommunications.

Therefore, it also becomes possible to use Push-Type Telecommunications simply as a household-electric-appliances device, in a method other than that of personal computers, such as television.

Procedure 3: Grasp of the timing of information dispatch, informational acquisition, and display The procedure after this is made to be the same as that of the form 5 of enforcement.

Screen Operation with a Sound:

As the form 5 of enforcement showed, the Web link by voice operation, etc., is enabled by carrying out screen operation using a sound using home electronics, such as television linked to the Telecommunications network.

In case of a reference screen tends to be chosen and it is going to carry out text input by the speech recognition function, even when the accuracy of the speech recognition function dealing with a telephone voice speaker unspecified in Computer 23 is not high enough, two or more candidates, such as a homonym that Computer 23 has effectively narrowed down, are transmitted and displayed on Client 11, and it becomes to some extent possible by making Telephone Caller A choose with a sound to use search engines, such as Google.

The Form 7 of Enforcement

In FIG. 8, it does not connect with a communication means between the clients and telephones with which each uses Telephone Caller A and Telephone Caller B, but Telephone 10 and Telephone 30 are connected through Telephone 20.

With this form, Server 21 can check the connection state of a telephone, and disconnection operation directly from Telephone 20, without being dependent on the system of a telephone call place. In other words, although we are anxious about changing Telephone Caller A's telephone sound, and transmitting to Server 21, or Telephone Caller B is not going to pass the information to Server 21 intentionally but rather is going to continue Push-Type Telecommunications after the telephone is disconnected with the forms 5 and 6 of enforcement, there is no such uneasiness in the form 7 of enforcement.

Procedure 1: Connection of a Client and Telephone

Telephone Caller A reads out the telephone number of Telephone 30, after it calls Telephone 20 from Telephone 10, and a telephone line connects. Voice data, such as a read-out telephone number of Telephone 30, is transmitted to Computer 23 which has a speech recognition function through Server 21, and is converted into text data, Telephone 20 calls Telephone 30 based on the telephone number formed into text data, and Telephone 10 and Telephone 30 are connected.

In addition, this telephone-line-connection operation is chosen from the telephone number list saved to Telephone 10, and the user may make it transmit a telephone number to Telephone 20 or it is told to Telephone 20 simpler, and telephone transmission may be made to be carried out by the button operation at the time of choosing from a telephone number list and calling, etc., Moreover, it may be based on voice operation or read out using the automatic response system from the telephone number list included in Telephone Caller A's individual data saved to Computer 23.

Additionally, Server 27 is accessed from Client 11 and Client 31, arbitrary specific codes are transmitted to each client from Server 27, and it is displayed on a monitor.

Procedure 2: Collation of an IP Address and a Telephone Number

The specific code displayed respectively is read out, the sound is transmitted to Telephone 20, and Telephone Caller A and Telephone Caller B are told to Computer 23 through Server 21, and they are formed into text data by the speech recognition function, and are again returned to Server 21.

Server 21, which received the text data from Computer 23, saves by making each telephone number and the text data concerned into a pair. Server 21 transmits the text data to Server 27, and in Server 27, they compare it and the specific code that had been transmitted before, deduces the IP address of Client 11 and Client 31, combines an IP address, etc., and text data, and transmits to Server 21.

Server 21 matches an IP address of each client, a telephone number of each telephone, etc., which have been sent from Server 27 from an opposite relation with the text data. Recognition procedure presupposes that it is the same as that of the form 6 of enforcement.

Thereby, preparation of Push-Type Telecommunications is completed.

The Other Connection Methods:

The telephone number of Telephone 10 and the IP address of Client 11 are both matched (like the above) by the reading of a specific code in the stage in which Telephone 20 is called from Telephone 10 and accessed Server 27 from Client 11. Then, the individual telephone number list of Telephone Callers A beforehand saved to Computer 23 by voice operation is displayed on the monitor of Client 11, the telephone number of Telephone 30, etc., is determined by making Telephone Caller A choose, and based on this, Telephone 20 calls Telephone 30, connects a telephone line, and it may be made to match the telephone number of Telephone 30 and the IP address of Client 31, etc., in the same procedure after that.

Procedure 3: Grasp of the Timing of Information Dispatch, Informational Acquisition, and Display The procedure after this is made to be the same as that of the form 5 of enforcement.

The Other Operation Methods:

It replaces with operation described previously, and which reads out the other party's telephone number with a sound, and you may make it tell the other party's telephone number to Telephone 20 by button operation of telephone. Similarly, it may replace with the screen operation with a sound, and button operation of telephone may perform selection operation of the item currently assigned to 1-10 on the monitor.

Screen Operation by Both.

Both Telephone Caller A and Telephone Caller B are able to perform screen operation shown with the form 5 of enforcement by the same method also in the form of which enforcement. For this reason, while Telephone Callers A and B both look at the same screen, the act of operating it mutually is also possible.

In the same way, also in the enforcement form, the use as a TV phone can be considered by equipping each client with a camera and then sending a picture to the other party's client mutually via Server 21 by UDP. Although a telephone is fundamentally considered to be negative in terms of user-friendliness considering the case of a hearing-impaired person, its notification and calling by light, vibration, etc., and application of using as a sign language telephone by performing picture transmission by UDP is also assumed. It is also effective as Client 11 and Client 31 connecting directly and transmitting UDP mutually in the stage, matching of an IP address and a telephone number, etc.

The Form 8 of Enforcement

In FIG. 9, between the clients and telephones with which each uses, Telephone Caller A and Telephone Caller B are connected with the wireless communications method, and Telephone 10 and Telephone 30 are connected through Telephone 20.

With this form, Server 21 is enabled to tell the timing which sent out information to each client through Telephone Lines 13 and 14, Wireless Telecommunications Methods 13 and 33, and each client can send a request message to Server 21 in response to it. In this case, even if there is no publication, especially in a request message, the information that should be sent out can be specified in Server 21.

The signal sound defined beforehand is sufficient as a means to tell informational transmission, and when a telephone line can perform voice transfer and data communications simultaneously, the command data defined beforehand may be made into a method to notify informational sending out, and may be used for it.

Collation and matching of a telephone number and an IP address also transmit a self IP address and the telephone number of both telephones to Server 27 from each client through Wireless Telecommunications Methods 13 and 33, and become possible by comparing the telephone number made into the pair.

Moreover, you may perform informational transmission and reception through Telephone Lines 14 and 34 and Wireless Telecommunications Methods 13 and 33, without Communication Networks 15 and 35.

The timing of information transmitted is not from Server 21, and may be directly transmitted between clients through Wireless Telecommunications Methods 13 and 33 and Telephone Lines 14 and 34.

Procedure 1: Connection of a client and telephone, collation of an IP address and a telephone number The Method of the Form 7 Enforcement is Followed.

Example 2 of the Connection Method

As shown in FIG. 10, Telephone Caller A calls Telephone Caller B directly, and connects a telephone. If agreed for both to perform Push-Type Telecommunications by conversation, the Push-Type telecommunications software of both telephones will start by button operation of both telephones. When each telephone can transmit and receive both a sound and data, a suitable negotiation process is stepped on by Push-Type telecommunications software among both telephones, and an IP address of Server 21 and a telephone number of Telephone 20, etc., which were saved to one of the telephones are chosen. Once the Push-Type telecommunications software of both telephones disconnects the telephone at the moment, Telephone 20 is called, the other party's telephone number, etc., is transmitted to further Telephone 20, and Telephone 20 sends the telephone number, etc., to Server 21. Call from both is compared in Server 21 in which Push-Type telecommunications software has started beforehand, and Telephone Line 14 and Telephone Line 34 are connected in Telephone 20.

Additionally, the Push-Type telecommunications software of both telephones transmits an IP address and each telephone number, etc., of Server 21 to Client 11 through Wireless Telecommunications Method 13 and to Client 31 through Wireless Telecommunications Method 33.

Each client accesses Server 21 based on the IP address which received, and transmits each telephone number, etc., to Server 21.

Server 21, which received access, compares the information from Telephone 20, and the information from each client, matching of an IP address and a telephone number, etc., is made, and preparation of the Push-Type Telecommunications accompanied by a telephone call is completed.

The Example 3 of the Connection Method

As shown in FIG. 10, Telephone Caller A calls Telephone Caller B directly, and connects a telephone. By conversation, if agreed for both to perform Push-Type Telecommunications by conversation, the Push-Type telecommunications software of both telephones will start by button operation of both telephones. A suitable negotiation process is stepped on by Push-Type telecommunications software between both telephones, and the IP address of Server 21 saved to one of the telephones, etc., is chosen. As for the Push-Type telecommunications software of both telephones, the other party's telephone number, etc., and the command that starts Push-Type telecommunications software in Clients 11 and 31 are transmitted to Clients 11 and 31 through Wireless Telecommunications Methods 13 and 33.

Push-Type telecommunications software starts in Client 11, Server 21 is automatically accessed based on the IP address set up beforehand by this, and the telephone number of Telephone 30 and the telephone number of Telephone 10, etc., are transmitted. The telephone number of Telephone 10 and the telephone number of Telephone 30, etc., are transmitted to Server 21, similarly from Client 31.

In Server 21, matching of a telephone number of Telephone 10, an IP address of Client 11, a telephone number of Telephone 30, etc., an IP address of Client 31, etc., is carried out.

The fact of matching completed and the telephone number of Telephone 20, etc., is transmitted from Server 21 to 10 and Telephone 30 via Clients 11 and 31, and the Push-Type telecommunications software of each telephone at first disconnects a telephone, and re-connects it to Telephone 20. Telephone 20 transmits both voice data to Server 21, and connects both telephone lines in Server 21, which recognize the telephone number of both telephones, etc., and preparation of Push-Type Telecommunications is completed.

The Other Examples of the Connection Method

In the example 3 of the connection method, re-connection may not be made from Telephones 10 and 30, but Telephones 10 and 30 may be called from Telephone 20 or many methods can be taken, like calling Telephone 20 from Telephone 10, and Telephone 20 calling Telephone 30 after that.

Moreover, for the example 3 of the connection method, you may make it determine Server 21 about selection of Server 21 as well as the form 6 of enforcement using Server 27.

Additionally, Telephone 10 calls Telephone 20 from the beginning, the telephone number of Telephone 30 is told and Telephone 20 may be made to call Telephone 30.

Thus, effective connection procedures can assume various procedures. In order to make Push-Type telecommunications software simple, standardizing the most suitable procedure is most desirable.

Procedure 2: Grasp of the Timing of Information Dispatch, Informational Acquisition and Display Grasp of the timing of information dispatch follows the method of the form 7 enforcement, and also directions of generating, such as signal sound, go to Telephone 20 at the time information is transmitted from Server 21. The signal sound, which can be distinguished if Telephone 20 differs from a natural person's voice clearly through a telephone line, is sent to the telephone of the information transmission place. The Push-Type telecommunications software of the telephone that received this may take out an information acquisition command to the Push-Type telecommunications software of a client through a wireless communications means, and the client concerned may carry out to Server 21 by sending a request message based on this.

Since the information Server 21 should send out, even if there are no concrete directions of information to acquire in the request message that the client concerned transmitted also in this case is known, the information concerned is sent out to the client concerned and the client concerned displays the received information on a monitor.

The Form 9 of Enforcement

In FIG. 10, between the clients and telephones with which each uses, Telephone Caller A and Telephone Caller B connect with wireless communications means, and Telephone 10 and Telephone 30 are connected directly. Telephone 20 is not present.

Furthermore, with this form, Server 21 has been enabled to confirm the condition of the timing that sent out information to each client through Communication Networks 15 and 35, Telephone Lines 13 and 14, Wireless Telecommunications Method 13 and 33, and each client can send a request message to Server 21 in response to it.

Collation and matching of a telephone number and an IP address, etc., can also be performed by Server 21 on a Telecommunications network through 13 and Wireless Telecommunications Method 33.

The other party's client can also be told about the timing of information transmitted with a specific signal (sound) through the wireless communications means and telephone lines from each client, not from Server 21.

Procedure 1: Connection of a Client and Telephone, Collation of an IP Address and a Telephone Number From Telephone 10, Telephone Caller A calls Telephone 30, and connects. In Telephone Callers' A and B conversation, it is agreed to begin performing Push-Type Telecommunications, and both sides start the Push-Type telecommunications software of each telephone by button operation of telephone.

Negotiation process between both telephones is performed by Push-Type telecommunications software, the IP address of Server 21 saved to one of telephone, etc., is chosen, it is shared between both telephones, and the telephone number of both telephones and the IP address of Server 21, etc., are told to each client through a telephone line and a wireless communications means.

Each client accesses Server 21 automatically by Push-Type telecommunications software. The global IP address of each client, etc., and the telephone number of telephone, etc., are made into a pair via a Router from both clients, the information which added the telephone number of the other party's telephone is transmitted to Server 21, in Server 21, the IP address of a client, etc., and the telephone number of telephone are matched from the telephone number between both, etc., and preparation of Push-Type Telecommunications is completed.

Procedure 2: Grasp of the Timing of Information Dispatch, Informational Acquisition and Display Grasp of the timing of information dispatch is performed as follows.

When each client sends out information, the command that generates the signal of information transmitted through a wireless communications means is sent to a telephone. The signal sound which can be distinguished if telephone differs from a natural person's voice clearly through a telephone line is sent to the telephone of an information sending out place. The Push-Type telecommunications software of the telephone which received this takes out the command of information acquisition to the Push-Type telecommunications software of a client through a wireless communications means, and the client concerned sends a request message to Server 21 based on this.

Regarding the information Server 21 should send out, even if there are no concrete directions of information to acquire in the request message which the client concerned transmitted, the information is transmitted to the client concerned and the client displays the received information on a monitor.

You may use Server 27 in the determination of Server 21 like other forms.

The Form 10 of Enforcement

In FIG. 11, transmission and reception of the data between clients suppose that it is directly made without Server 21.

In Server 21, if the telephone number of Telephone 10 and an IP address of Client 11, etc., the telephone number of Telephone 30 and an IP address of Client 31, etc., are recognized as a pair, Server 21 will transmit the information to Client 11 and Client 31.

In both clients, since the other party's IP address is known, it becomes possible to transmit and receive data directly by suitable methods, such as P2P technology.

However, it is necessary to perform measures against a virus, choose operation of data, and check operation of the connection state of a telephone line in each client, or to tell a telephone call situation continuously to Server 21 in this case.

Protocol:

The fundamental technical composition of the Push-Type Telecommunications accompanied by a telephone call consists of the signaling technology for connecting a telephone, the voice transfer technology for talking over the telephone, the data transceiver technology on a Telecommunications network, the technology of cooperating a telephone line and a Telecommunications network and delivering data, and the technology of matching the client that each telephone caller uses and the telephone.

Suppose the arbitrary networks that became independent respectively are used for a telephone line and a Telecommunications network. Moreover, suppose that adjustment of the interface between both is taken with the technology of cooperating a telephone line and a Telecommunications network and delivering data.

It describes about the signaling technology for connecting a telephone and the voice transfer technology for talking over the telephone.

A telephone line may use the telephone line of any systems, such as a public telephone network of an analog standard, a cellular-phone network of the 1st generation of an analog system, a cellular-phone network after the 2nd generation of a digital system, IP telephone and an Internet telephone.

Therefore, for the signaling technology for connection of a telephone line, you may use the common channel signaling #7 (SS7) of an analog standard public telephone network, signaling technology, such as H.323 and SIP (Session Initiation Protocol) for connecting an analog telephone and IP telephone, or for IP telephone, a protocol, signaling technology of Megaco/H.248 and others, also, you may use the arbitrary existing technology and the technology which will newly appear from now on, such as a protocol. The communication systems which enable talk over the telephone as well as protocol may be arbitrary, and telephone voice coding technology is also arbitrary and effective.

TCP/IP technology is used in a Telecommunications network.

Although it does not eliminate the possibility that this invention uses protocols other than this, since the Internet is constituted based on TCP/IP technology, it is considering fundamental in this invention on the assumption that TCP/IP will be utilized.

A UDP (RTP) packet is normally used for the transmission and reception of voice data. However, it is also effective for transmitting and receiving data by protocols other than TCP/IP, using the dedicated line network not of a public Internet network, but of a cable or wireless.

This hereby describes the technology of cooperative efforts for using a telephone line and a Telecommunications network and delivering data.

In order to perform Push-Type Telecommunications accompanied by a telephone call between numerous and unspecified clients and telephone, by telephones linked to a Telecommunications network, in the protocol terminus function of an analog standard public telephone network, a cellular-phone network, and IP telephone network based on various signaling technology, the difference in an interface shall be absorbed, respectively, and it shall connect with a Telecommunications network as a unific protocol.

When the telephone linked to a Telecommunications network has received the analog signal, it shall be coded appropriately.

If connection of a telephone line is made, the packet which indicated the completion of connection of a telephone line, both telephone number, etc., will be sent to a client through LAN, etc.

Then, it is transmitted and received with the form to which voice data fitted communication of voice data, such as a RTP packet.

The technology for matching of the client each telephone caller uses and telephones has already been explained. However, since this is what is invented for the first time in this specification, there is nothing of the form widely recognized as a protocol.

In order to match an IP address, etc., and a telephone number, etc., the packet of form which indicates the information on others, such as a telephone number, in a data part taking advantage of the IP address and port number indicated by the header of a TCP/IP packet and in an application layer, the new protocol for the Push-Type Telecommunications accompanied by a telephone call is defined, and indicating the information on others, such as a telephone number, is assumed.

An example of a communication form is hereby described.

In FIG. 7, Telephone 30 shall be used as H.323 terminal with a VoIP gateway function, and the connection of a telephone line by the signaling protocol H.323 and the voice data communications by RTP (real time transmission protocol) shall be made.

In order to transmit the state information and voice data of signaling of a telephone line to Server 21 or Server 27 through a Telecommunications network, it shall be controlled by adding a new header (henceforth a PUSH header) to TCP or an UDP packet.

Telephone 30 receives a call from Telephone 10, and by permission of call by H.225.0. by setup of call by Q.931, if the capability negotiation and a logic channel setup between the end points by H.245 are made, a telephone call will become possible between both telephones. A setup of communication conditions, such as the coding method of a voice signal and access speed, is made with the above H.245. By Telephone 30, the telephone number of Telephone 10, etc. is received from the gatekeeper in the meantime.

The telephone number of Telephone 10, etc., and connection of a telephone line are notified to Client 31 from Telephone 30.

Client 31 adds the PUSH header that indicated the telephone number of Telephone 10 and Telephone 30, etc., and transmit the TCP/IP packet which indicated the connection start of the IP address of Server 21, etc., and a telephone line in the data part to Server 27. Since it goes via Router 36, the global IP address and port number of Client 31 are indicated by IP header and the TCP header, Server 27 makes a pair of the IP address of Client 31, etc., and the telephone number of Telephone 30, etc., and recognizes them, and it recognizes that the telephone line was connected with Telephone 10.

Simultaneously, Server 27 makes access from Client 11, and the response message that indicated the specific code in the data part is returned to Client 11, and it is indicated by the text on the monitor.

From Server 27, the PUSH header which indicated the telephone number of Telephone 30 and the telephone number of Telephone 10, etc., is added, and the TCP/IP packet which indicated the IP address of Client 31, etc., and the IP address of the above-mentioned specific code and Client 11, etc., in the data part is transmitted to Server 21. When Server 27 has received access from two or more clients simultaneously, corresponding groups that transmitted to the data part at each client, such as two or more specific codes and an IP address, are indicated.

Telephone Caller A reads out the displayed specific code, and the voice data is transmitted to Telephone 30 via Telephone Line 14. Telephone 30 add the PUSH header which described the telephone number of Telephone 30 and Telephone 10, etc., through Client 31, and transmits the RTP packet carrying the voice data concerned to Server 21. By Server 21, the voice data from Telephone 10 and the voice data from Telephone 30 can be distinguished from position relations, such as a telephone number of Telephone 30 and a telephone number of Telephone 10 indicated by the PUSH header concerned, etc.

A specific code may read out and you may consider that operation is the consent act of Push-Type Telecommunications of Telephone Caller A. A consent act fixes suitable methods, such as starting operation of Push-Type telecommunications software, connection operation of telephone and a client, and connection operation of a telephone line.

Server 21 transmits and forms the voice data concerned into text data to Computer 23, which has a speech recognition function, and compares with the single or multiple specific codes previously sent from Server 27. It is recognized from the specific code by which coincidence with the text data concerned was checked in Server 21 that which the telephone number of Telephone 10 which are voice data and a pair, etc., and which the IP address of Client 11, which are a specific code and a pair concerned, etc., are pairs, matching is completed, and the Push-Type Telecommunications accompanied by a telephone call is effectively started.

Server 21 sends the TCP/IP packet that indicated the IP address of Client 11, which started Push-Type Telecommunications, etc., in the data part to Server 27, and Server 27 recognizes the start of Push-Type Telecommunications of Client 11.

While performing Push-Type Telecommunications accompanied by a telephone call, voice data are sent by the RTP packet that added the PUSH header to Server 21 from Client 31, and distinction of the sounds which any of Telephone Caller A and Telephone Caller B uttered are made from written positions, such as a telephone number of Telephone 10 of a PUSH header, etc., and a telephone number of Telephone 30.

Additionally, arbitrary information is suitably indicated by the data part of a TCP/IP packet from Client 31, and is then transmitted to Server 21. Server 21, which received the data concerned, opens the information file which received using suitable application, takes out only text data and a picture from information except for a program part, uses them as a HTML document, puts on a TCP/IP packet, and transmits to Client 11.

The browser of Client 11 requires, acquires and displays only image data on Server 21 again from the tag showing the picture embedded in the HTML document in addition to text data.

In transmission and reception of IP packet, it enciphers using IPSec (security architecture for IP) and considers the technique of elevating safety.

Even if the data transmitted to Client 11 are simple text data, link information and the program remain in Server 21, and it is shared with Computer 23.

The voice data of the telephone caller whom Server 21 received is sent and formed into text data by Computer 23 that always has a speech recognition function. When the voice-text data concerned is in agreement with the text parts to which link information was added, based on link information, Server 21 acquires a new HTML document from the Internet, they take out only text data and a picture the same with having stated previously, draw up a HTML document, put it on a TCP/IP packet, transmit to Client 11 and Client 31, and are displayed in each monitor. In collation of the text parts to which voice-text data and link information concerned were added, since the number of the links currently displayed on the monitor, i.e., the number of the texts in which link information was added, is restricted, even if it is the telephone sound of a speaker independence, collation becomes possible comparatively easily.

After a telephone call is completed, Telephone 31 transmits the TCP/IP packet that added the PUSH header that indicated the telephone call end to Server 21, and Push-Type Telecommunications closes them.

When call control technology is not unified, one must distinguish whether Server 21, which received the call control packet, is based on SIP or something based on H.323 or another thing based on a variant protocol. Therefore, in order to connect a Telecommunications network with a telephone line, it is necessary to further add the negotiation procedure for performing adjustment(s) that call control technology to use. You may use a PUSH header for this negotiation procedure, or a protocol is converted in each telephone and it may be made to carry out information transmitted. However, this necessity is not produced in the telephone that is not connected to a Telecommunications network.

With the dial of a push button system, the number of 0-9, #, and * buttons send out the signal which combined two sorts of frequency, 697 Hz-941 Hz and 1209 Hz-1477 Hz. However, using the speech recognition function of Computer 23 in which this signal was received via Server 21, a certain command is matched with the combination of this button operation, and it becomes possible to operate the program of Computer 23 by push button operation.

That is, it replaces with a voice command and operation of working a certain application that which previously performed screen operation by button operation.

By Computer 23 that received the previous voice signal, since the frequency of this voice signal differs from the basic frequency (in general, 300 Hz or less) of a natural person's sound greatly, it can recognize in distinction from a conversation sound.

In the Push-Type Telecommunications accompanied by a telephone call, it is supposed that the transmitted information is displayed passively and automatically. However, it is also assumed to restrict use of ActiveX and Cookie, Java script and Java applet, etc., Since pop-up ones, etc., takes up some screens, the possibility of enabling a blocking function is high.

When the client which both the telephone callers use through Server 21 is connected, it becomes possible not to depend on operation of the other party of a telephone call, but to delete automatically the part unsuitable for the Push-Type Telecommunications accompanied by a telephone call out of the data received in Server 21, and to transmit to a reception side. For example, if it is an HTML document, description of Java script, VB script and ActiveX will be deleted in Server 21. It asks with an automatic sound for approval, after transmitting the eliminated document, and if affirmed, the method of re-transmitting a message of the original HTLM document will be assumed.

When anxious about the possibility of a virus lurking in a file, in Server 21, a file is opened at first, and after checking that there is no virus present, the method of rewriting and transmitting to an HTML document without a program part can take inner data.

Although it will be necessary to perform such an operation in the client of a receptacle hand when transmitting and receiving data directly between clients, without enabling Server 21, operation becomes complicated or we are anxious about Push-Type telecommunications software becoming complicated.

An always-new virus occurs, and in a client side, while a possibility that the newest virus measure software does not necessarily come to hand is assumed, the point of safety in the method of transmitting and receiving data directly between clients, without minding Server 21 is asked for separate consideration.

The method of matching of a client and telephone can also be taken by replacing with the method of reading out the specific code sent from Servers 21 and 27, generating a voice pattern from the speaker part of a client based on the voice data that Server 21 has transmitted, and returning to 21 or Server 27 in response to this voice pattern by telephone.

Moreover, specific text data and specific voice data which a client has are simultaneously transmitted at the time of access to 21 or Server 27 of a client, and it indicates by the monitor in parallel at it, or a sound is generated from a speaker, and this is read out, or telephone receives, and the method of comparing by Server 21 or Server 27 is also considered.

There is also a way a telephone caller reads and returns picture information such as the sent QR code, with the camera attached to a portable telephone.

Additionally, in Client 31, a router, an access node, and the position information on radio base stations are described to a PUSH header, it transmits to Server 27, and it matches by combining with the position information on the client obtained by the special method, the candidate of device is narrowed down, and the physical means of matching, such as checking by the previous method, is considered.

Example of the Enforcement:

Case 1 of the Operation

The case of the operation in the case of using the large-sized monitor that uses the large-sized, high-definition TV sitting in a room as a monitor, or is installed in a station, etc., is shown. The pocket IP telephone is used as telephone.

In FIG. 4, Client 11 and Telephone 10 are connected by wireless LAN from 17 access points, and Client 11 is connected with Communication Network 15 through this wireless LAN. Telephone 10 is considered as a radio (wireless) IP telephone.

Telecommunications Methods 13 are wireless LAN, which has connected Telephone 10 with Client 11. Communication Network 15 and Telephone Line 14 are illustrated as two for convenience, although it is the same course substantially between Access Point 17 and Router 16.

In this case of the operation, Telephone Caller A has accessed the Internet information browsing operation support service entrepreneur or the mail order entrepreneur (only henceforth Entrepreneur B) using a pocket IP telephone. You may use a cellular phone as input equipment.

Procedure 1: Telephone Caller A telephones Entrepreneur (telephone caller) B.

Procedure 2: Entrepreneur B notifies the purport, which starts Push-Type Telecommunications by telephone, and directs the check procedure that offers Push-Type Telecommunications to Telephone Caller A.

Procedure 3: The URL information for accessing to Server 21 specified to be Telephone 10 from Telephone 30 is sent, and this URL information and the telephone number of Telephone Caller A and the Push-Type Telecommunications permission command further generated by button operation of Telephone Caller A's cellular phone are sent to Client 11 by wireless LAN. Client 11 starts Push-Type telecommunications software based on the Push-Type Telecommunications permission command, and accesses the specification Web page of Server 21 using the URL information, and the Push-Type Telecommunications permission command and the telephone number of Telephone Caller A also transmits them to Server 21 simultaneously.

In Server 21, Push-Type telecommunications software starts, based on a Push-Type Telecommunications permission command, the telephone number of Telephone 10 obtained at the time of telephone connection, and the telephone number of Telephone 10 transmitted from Client 11 are compared, initial screen data sent to Client 11, and preparation of Push-Type Telecommunications service is completed.

Procedure 4: When Entrepreneur B judges it as the timing that should send the information considered to be suitable while Telephone Caller A and Entrepreneur B go ahead with conversation, the transmitting information C is sent out to Server 21 from Client 31.

It can come simultaneously as the signal of information transmitted is sent to Telephone 10 from Telephone 20, Client 11 through Telecommunications Method 13.

Procedure 5: In Client 11 that received the information transmitted signal, Push-Type telecommunications software transmits a request message to Server 21, Server 21 that received the request message change Information C into an HTML document, and returns it to Client 11 as a response message. Client 11 carries out the picture display of the received HTML document to a monitor, or it is played.

Procedure 6: Hereafter, Procedures 4 and 5 are wound suitably and returned. (Repeat.) By using a large-sized, high definition monitor and a highly efficient speaker, Entrepreneur B can perform service offering or goods introduction that has a greater presence or force, and can lead conversation. Moreover, since it is not accompanied by operation that is complicated for Telephone Caller A, and consciousness can be concentrated on conversation and a screen, it becomes a user-friendly information acquisition method.

Procedure 7: If Telephone Caller A or Entrepreneur B disconnects a telephone, disconnection information will be notified to Clients 11 and 31, respectively, it will be told to no less than Server 21, and Push-Type Telecommunications will be completed.

Case 2 of the Operation

With device composition like the case 1 or case 2 of FIG. 1, use wireless LAN like a case of the operation 1 as Telecommunications Methods 13 and 33, the use form that Telephone Caller B is a dedicated customer of an association's support operation of the Telephone Caller A, who is an elderly person, is assumed.

The procedure of Push-Type Telecommunications is performed like the form 1 of enforcement and the form 2 of enforcement, etc., or it may be chosen from a method that was indicated with a method to solve a subject suitably, and that method may be defined.

Although Telephone Caller A operates a personal computer individually, and the work of electronic commerce, etc., is done, if Telephone Caller A misunderstands a detail along the way, he/she will ask for Telephone Caller B's support. In this case, Client A chooses Push-Type Telecommunications at any time, or repeating being interrupted temporarily is assumed.

It can do with simple operation by Telephone Caller A performing selection of this Push-Type Telecommunications, and the change of momentary discontinuation by the button operation on the screen of Client 11, and distinguishing the meaning of the keyboard input of Push-Type telecommunications software of Client 11 based on the operation, and telling selection of Push-Type Telecommunications, and the change of momentary discontinuation to Server 21.

Support of personal computer operation of Telephone Caller A by the Telephone Caller B can be offered by using advice together during conversation, and the visual information by Push-Type Telecommunications.

Case 3 of the Operation

Public Information Service Station:

FIG. 5 is a wireless LAN access point, a computer, a monitor, a microphone, a speaker, and a case of the operation of installing an operation button and a camera if needed further, and considering as a public information service station on the present public telephone booth, a bus stop, and the enclosure of a station. Communication Network 15 is connected to the public Internet network.

The following services are assumed in this public information service station.

(1) As the station of the wireless LAN service used nearby.

(2) Use of a pocket IP telephone near this service station and as a TV telephone in front of a monitor.

(3) Use as a Push-Type Telecommunications method accompanied by the telephone call of this invention. A user telephones from the pocket IP telephone to possess, and performs Push-Type Telecommunications accompanied by a telephone call.

Specifically, studying is requested from an acquaintance, showing a route around on a map, telephoning to the entrepreneur currently introduced by the station advertisement and getting information with visual information and use various services on a network, such as automatic translation service, etc., are the given examples.

(4) Connect with the computer equipped with the automatic voice response function on a network, and use for a circumference map display, circumference convenience institution guidance, the telephone directory-assistance service with the large character display, traffic guidance, a taxi call, etc.

(5) In addition, use is also possible in various services on the Internet.

(6) Install a camera in front of a monitor, use for an urgent TV telephone report device (equipment) connected to a surrounding police box (Koban) and a fire department.

(7) As a method to install a camera so that the circumference may be projected, and to secure a pedestrian's security.

(8) When placed within the enclosure of a station, etc., and not using wireless LAN, it may be used as an information bulletin board, such as an advertisement.

(9) Additionally, if the same device composition is put on the empty store of a shopping center, etc., it can also consider as an uninhabited service store. The use procedure in this case can take some methods described until now. Although an entrepreneur will talk by transmitting goods information, explanation information, etc., suitably, if it limits to the notation on a screen, since speech recognition is easy, it can also automate procedure, such as goods and service selection, a sales contract, a delivered procedure, and settlement of accounts, for speaker independence using speech recognition.

Case 4 of the Operation

In FIG. 2, both Telephone Caller A and the overseas Telephone Caller B connect with Server 21, and the case of the operation of receiving the foreign language study support using the translation function of Application Server 23 is shown.

In this procedure, the Push-Type Telecommunications accompanied by the telephone call is the same as the form 2 of enforcement.

Procedure 1: Telephone Caller A and Telephone Caller B access the specific Web page of Server 21 from each client, use form, and it registers with the foreign language study support proposer list of Server 21 by pushing the application button displayed on a screen. Simple personal information, such as one's native language, sex, age, and partner of choice, is also collectively registered into the form.

Procedure 2: If a Web page is updated and the picture display of the foreign language study support list is carried out, Telephone Caller A will propose by choosing against Telephone Caller B.

Procedure 3: Telephone 20 calls Telephone Caller B, and tells the purport to which the application is coming by an artificial sound from Telephone Caller A. If Telephone Caller B tells the purport of comprehension, it understands that it understood by the automatic speech recognition function of Application Server 23, and Telephone 20 will call Telephone Caller A, and the telephone of Telephone Caller A and Telephone Caller B will be connected through Telephone 20.

Procedure 4: The sound that Telephone Caller A or Telephone Caller B uttered is transmitted to the other side through Telephone 20. Simultaneously, Server 21, which received voice data, transmits this to Application Server 23. Application Server 23 translates the voice data concerned into the text data of the language of the other side with automatic speech recognition software and automatic translation software for every clause, and Push-Type Telecommunications sends out Server 21 that received the text data concerned to the client of the other side as an HTML document.

Procedure 5: The client of Telephone Caller A and Telephone Caller B uses as text data the HTML document sent from Server 21, and carries out a picture display.

Procedure 6: Procedures 4 and 5 are repeated hereafter.

Procedure 8: When a telephone service is disconnected, Server 21 ends Push-Type Telecommunications.

As long as Telephone Caller A or the overseas Telephone Caller B knows the other party's telephone number beforehand, the telephone number concerned is inputted in the stage that accessed the Web page of Server 21. Then Server 21 calls the other side, and the procedure that connects with Server 21 is completed.

Some time will be needed by the time text data arrives, after language is emitted. In addition, although the translation capability of translation software still is not sufficient, either, since two or more translations can also be listed about one language, usage that would be sufficient as an object for education can be achieved.

Case 6 of the Operation

For example, four telephone callers access Server 21 simultaneously, and they receive mah-jongg game service, or two persons access simultaneously and receive shogi and igo service, people can enjoy talking about various games using the application server on a network, even if one's own personal computer is not equipped with an application for processing some phrases as commands parallel to conversation, recognizing a sound automatically. Hereafter, mah-jongg is described as an example.

In this case of the operation, the Push-Type Telecommunications accompanied by the telephone call is the same as the form 2 of enforcement.

Procedure 1:

Telephone Caller A, Telephone Caller B, Telephone Caller C, and Telephone Caller D register with the mah-jongg game service proposer list of Server 21 by pushing an apply button on the display, having accessed the specific Web page of Server 21 from each client, and having been displayed on the screen using form. Simple personal information, such as sex, age, and a partner of choice, is also collectively registered into form.

Procedure 2: If a Web page is updated and the picture display of the game service proposer list is carried out, Telephone Caller A will propose by choosing against Telephone Callers B, C, and D.

Procedure 3: It understands that Server 21 was understood by the automatic speech recognition function when Telephone Callers B, C, and D were called, the purport to which the application is coming by the artificial sound from Telephone Caller A was told, Telephone Callers B, C, and D acknowledged comprehension, and Server 21 calls Telephone Caller A, and the telephone of Telephone Callers A, B, C and D, so all the members are connected through Telephone 20.

Procedure 4: Telephone 20, which received the voice data Telephone Caller A or Telephone Callers B, C, and D emitted, sent voice data to Application Server 23, changed into text data with the automatic speech recognition software of Application Server 23 and fixed voice data, such as "Pon" and "CHI", is now recognized, and it processes as input data to mahjongg game application while transmitting to other telephones of three people as it is.

It is processed, and the output data of the screen of four sheets where the game advanced is changed into the HTML document containing the tag that expresses a picture in Server 21, and is sent out to four individual Clients, which are 11, 31, 41, and 51 by Push-Type Telecommunications, respectively.

Procedure 5: Clients 11, 31, 41 and 51 carry out the picture display of the HTML document and picture that have been sent from Server 21.

Procedure 6: Procedures 4 and 5 are repeated hereafter.

Procedure 7: If the display data with which Server 21 requests the yes or no of continuation whenever a game takes a round is sent out to four persons and three persons' telephone service is disconnected, Server 21 will then end Push-Type Telecommunications.

As long as Telephone Caller A knows the three other parties' telephone numbers in advance, in the stage which accessed the Web page of Server 21, the telephone number concerned is inputted, and based on this, Telephone 20 calls the three other sides, and thus may also complete a procedure that connects with Server 21.

USABILITY IN THE INDUSTRY

As explained above, by employing this invention, people without a substantial knowledge of fundamental computer operations will be able to use the Internet easily, with a simplicity of operation like that of a telephone, and thus such a system that will certainly become widespread can be offered successfully.

The invention claimed is:
1. A communication system comprising:
  a source telephone at a first location connected to public switched telephone network (PSTN) network;
  a first client apparatus for the source telephone at the first location connected to a packet switched network;
  a destination telephone at a second location connected to the PSTN network;
  a second client apparatus for the destination telephone at the second location connected to the packet switched network;
  the packet switched network further comprising:
    a first server configured to provide access to the first client apparatus and the second client apparatus when the source telephone activates push-type telecommunication service;

a second server configured to provide the push-type telecommunication service to the first client apparatus;

a computer configured to provide a data processing function to the second server, the source telephone configured to place a call through the PSTN network to the destination telephone, in response to the call:

the first client apparatus configured to activate a push-type telecommunication software and access the first server via the push-type telecommunication software;

the second client apparatus configured to receive a number of the source telephone and an address of the second client apparatus from the destination telephone, wherein the second client apparatus sends the number of the source telephone and the address of the second client apparatus received from the destination telephone to the first server;

the first server configured to determine the second server for providing the push-type telecommunications service in response to receiving the number of the source telephone and the address of the second client apparatus and to send an address of the second server to the second client apparatus, wherein the second client apparatus accesses the second server based on the address of the second server;

in response to said accessing the first server via the push-type telecommunication software from the first client apparatus, the first server configured to send a specific code to the first client apparatus, and send a group of the addresses of the second client apparatus, a number of the destination telephone, and the specific code to the second server, the source telephone configured to send data of the specific code to the first server via the destination telephone and the second client apparatus, the first server configured to determine if the data of the specific code received via the destination telephone and the second client apparatus match the specific code sent to the first client apparatus;

the first server configured to:

notify the second server of a combination of the address of the first client apparatus and the address of the second client apparatus corresponding to the matched specific code and the data of the specific code, and notify the first client apparatus of the address of the second server, wherein the first client apparatus accesses the second server via the push-type telecommunications software, and wherein the second server configured to compare information of the first client apparatus with information of the second client apparatus and determine that the first client apparatus and the second client apparatus are to be connected to each other via the second server, associates the first client apparatus and the second client apparatus with each other, and enable the push-type telecommunication service between the first client apparatus and the second client apparatus via the second server.

2. The communication system according to claim 1, wherein:

the source telephone is configured to send a voice of a user via the destination telephone and the second client apparatus to the second server, when a user of the source telephone reads out the specific code indicated on the first client apparatus and the computer is configured to obtain the voice from the second server, perform data conversion for the voice to produce converted voice data, and send the converted voice data via the second server to the first server.

3. The communication system according to claim 1, wherein the second server confirms, based on the access by the first client apparatus, that the source telephone and the destination telephone are in a telephone conversation and that the push-type telecommunications software is active in both the first client apparatus and the second client apparatus, and provides the push-type telecommunications service to a user of the source telephone via the first client apparatus.

4. The communication system according to claim 1, wherein the first client apparatus and the source telephone are not connected to each other.

5. A communication system comprising:

a source telephone at a first location connected to public switched telephone network (PSTN) network;

a first client apparatus for the source telephone at the first location connected to the packet switched network;

a destination telephone at a second location connected to the PSTN network;

a second client apparatus for the destination telephone at the second location connected to the packet switched network;

the packet switched network further comprising:

a first server configured to provide access to the first client apparatus and the second client apparatus when the source telephone activates push-type telecommunication service;

a second server configured to provide the push-type telecommunication service to the first client apparatus;

a computer configured to provide a data processing function to the second server, the source telephone configured to place a call through the PSTN network to the destination telephone, in response to the call:

the first client apparatus and the second client apparatus configured to activate a push-type telecommunication software and access the first server via the push-type telecommunication software, when a connection is established between the source telephone and the destination telephone via the second server;

in response to said accessing the first server via the push-type telecommunication software from the first client apparatus, the first server configured to: send a first specific code to the first client apparatus and a second specific code to the second client apparatus, the source telephone configured to send to the second server, first input data comprising voice data of the first specific code indicated on the first client apparatus, the destination telephone configured to send to the second server, second input data comprising voice data of the second specific code indicated on the second client apparatus, the second server configured to send to the first server, a combination of the first input data and a telephone number of the source telephone and a combination of the second input data and a telephone number of the destination telephone, the first server configured to compare the combination of the first input data and the telephone number of the source telephone and the combination of the second input data and the telephone number of the destination telephone, and create an association by associating an address of the first client apparatus with an address of the second client apparatus, and send the association to the second server;

the second server configured to compares, based on the association, information of the first client apparatus with information of the second client apparatus, determine that the first client apparatus and the second client apparatus are to be connected to each other via the second server, and enable the push-type telecommunications service between the first client apparatus and the second client apparatus via the second server.

* * * * *